(12) United States Patent
Tanaka

(10) Patent No.: US 10,653,944 B2
(45) Date of Patent: May 19, 2020

(54) GAMING DEVICE, GAMING SYSTEM, NON-TRANSITORY STORAGE MEDIUM HAVING STORED THEREIN GAMING PROGRAM, AND SWING INPUT DETERMINATION METHOD

(71) Applicant: NINTENDO CO., LTD., Kyoto (JP)

(72) Inventor: Wataru Tanaka, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 532 days.

(21) Appl. No.: 15/584,409

(22) Filed: May 2, 2017

(65) Prior Publication Data

US 2017/0348592 A1    Dec. 7, 2017

(30) Foreign Application Priority Data

Jun. 6, 2016 (JP) .................................. 2016-112703

(51) Int. Cl.
| | |
|---|---|
| *A63F 13/211* | (2014.01) |
| *A63F 13/428* | (2014.01) |
| *G06F 3/01* | (2006.01) |
| *G06F 3/0346* | (2013.01) |

(52) U.S. Cl.
CPC .......... *A63F 13/211* (2014.09); *A63F 13/428* (2014.09); *G06F 3/017* (2013.01); *G06F 3/0346* (2013.01)

(58) Field of Classification Search
CPC ........ A63F 13/20; A63F 13/21; A63F 13/211; A63F 2300/10; A63F 2300/105
See application file for complete search history.

(56) References Cited

U.S. PATENT DOCUMENTS

| | | | |
|---|---|---|---|
| 7,412,348 B2* | 8/2008 | Okamura | A63F 13/10 702/152 |
| 7,815,508 B2* | 10/2010 | Dohta | A63F 13/10 463/37 |
| 7,938,725 B2* | 5/2011 | Okamura | A63F 13/10 463/37 |

(Continued)

FOREIGN PATENT DOCUMENTS

| | | |
|---|---|---|
| JP | 2007-300973 | 11/2007 |
| JP | 2009-284953 | 12/2009 |

(Continued)

OTHER PUBLICATIONS

Office Action dated Dec. 18, 2018, issued in JP 2016-112703 (4 pages).

*Primary Examiner* — Steven J Hylinski

(74) *Attorney, Agent, or Firm* — Nixon & Vanderhye, P.C.

(57) ABSTRACT

A body device of a gaming system includes a controller communication unit that acquires operation data including at least acceleration data from each of a plurality of controllers including acceleration sensors and a CPU that determines that a swing input has been performed on the basis of the acceleration data, for each of the controllers, and executes gaming processing on the basis of swing input determination. When it is determined that the swing input has been performed for one of the controllers and the other controller is in a swing state, the CPU determines that the swing input has been performed for the other controller at the same time as one controller and executes simultaneous swing gaming processing.

20 Claims, 22 Drawing Sheets

(56) References Cited

U.S. PATENT DOCUMENTS

| | | | | |
|---|---|---|---|---|
| 8,267,786 B2* | 9/2012 | Ikeda | ................ | A63F 13/06 463/37 |
| 8,308,565 B2* | 11/2012 | Nakanishi | ................ | A63F 13/00 463/37 |
| 8,469,814 B2* | 6/2013 | Shimamura | ............ | A63F 13/10 463/31 |
| 8,870,655 B2* | 10/2014 | Ikeda | ................ | A63F 13/06 463/36 |
| 9,278,280 B2* | 3/2016 | Koizumi | ................ | G06F 3/017 |
| 2005/0014542 A1* | 1/2005 | Ueshima | ................ | A63F 13/02 463/8 |
| 2005/0085298 A1* | 4/2005 | Woolston | ................ | A63F 13/10 463/37 |
| 2005/0143173 A1* | 6/2005 | Barney | ................ | A63F 13/428 463/37 |
| 2005/0176485 A1* | 8/2005 | Ueshima | ................ | A63F 13/10 463/4 |
| 2007/0049374 A1* | 3/2007 | Ikeda | ................ | A63F 13/06 463/30 |
| 2007/0111779 A1* | 5/2007 | Osnato | ................ | A63F 13/06 463/16 |
| 2007/0270222 A1 | 11/2007 | Yamanaka et al. | | |
| 2008/0309615 A1* | 12/2008 | Sato | ................ | A63F 13/10 345/156 |
| 2008/0318677 A1* | 12/2008 | Ohta | ................ | A63F 13/06 463/36 |
| 2010/0248833 A1* | 9/2010 | Okamura | ................ | A63F 13/06 463/36 |

FOREIGN PATENT DOCUMENTS

| | | |
|---|---|---|
| JP | 3165638 | 1/2011 |
| JP | 5525565 | 4/2014 |

* cited by examiner

GAMING DEVICE, GAMING SYSTEM, NON-TRANSITORY STORAGE MEDIUM HAVING STORED THEREIN GAMING PROGRAM, AND SWING INPUT DETERMINATION METHOD

CROSS REFERENCE TO RELATED APPLICATION

This nonprovisional application is based on Japanese Patent Application No. 2016-112703 filed with the Japan Patent Office on Jun. 6, 2016, the entire contents of which are hereby incorporated by reference.

FIELD

The present disclosure relates to a gaming device, a gaming system, a non-transitory storage medium having stored therein a gaming program, and a swing input determination method that determine that a swing input is performed for an operation device.

BACKGROUND AND SUMMARY

Conventionally, a gaming system including a gaming device and an operation device separate from the gaming device for inputting operation of a user to the gaming device as operation data is known. In addition, as an operation device, there is known an operation device that includes a sensor for detecting movement, such as an acceleration sensor, an angular velocity sensor, and the like, and inputs to the game device an operation that a user moves the operation device itself as operation data.

In the gaming system, the gaming device determines that a swing input operation has been performed on the operation device and a swing input has been performed for the operation device, on the basis of the operation data (hereinafter, also referred to as the "swing input determination"), and executes gaming processing according to the swing input determination. In addition, a gaming system for executing gaming processing according to a combination of swing inputs of a plurality of operation devices having the above configuration, using the plurality of operation devices, is known (for example, refer to Japanese Patent No. 5525565).

An object of the present disclosure is to provide a gaming device capable of executing simultaneous swing gaming processing, without causing a user to feel a delay, even when a deviation is generated in timings of swing inputs of a plurality of operation devices.

Another object of the present disclosure is to provide a gaming device capable of distinguishing one-hand swing and simultaneous swing, without waiting for determination on whether there is a swing input in the other operation device, when swing determination is performed for one operation device.

According to a first aspect, there is provided a gaming device comprising: an operation data acquisition unit that acquires operation data including at least data of an inertial sensor from a plurality of operation devices each including at least the inertial sensor; a swing input determination unit that, for each of the operation devices, determines that each operation device entered a swing state in which each operation device is being swung and that a swing input operation for each operation device has been performed, on the basis of the operation data; and a gaming processing unit that executes gaming processing, on the basis of determination in the swing input determination unit, wherein, when it is determined that the swing input operation has been performed for a first operation device among the plurality of operation devices and a second operation device among the plurality of operation devices is in the swing state, the swing input determination unit determines that the swing input operation has been performed for the second operation device.

By this configuration, in simultaneous swing inputs in which the plurality of operation devices are simultaneously swung, even when a deviation is generated in timings of swing inputs of the plurality of operation devices, the swing input determination unit determines the simultaneous swing of the plurality of operation devices at timing of the swing input determination of the operation device swung earlier. As a result, a user does not feel a delay of simultaneous swing gaming processing. In addition, the swing input determination unit determines that the operation device entered the swing state and that the swing input operation has been performed for the operation device. When the swing input determination has been performed for a first operation device and a second operation devices are in the swing state, the swing input determination unit determines the simultaneous swing. Therefore, one-hand swing and simultaneous swing can be distinguished at timing when the swing input determination is performed for the first operation device, without waiting for performance of the swing input operation for the second operation devices.

According to a second aspect, in the gaming device according to the first aspect, when it is determined that the swing input operation has been performed for the first operation device and the second operation device is not in the swing state, the swing input determination unit determines that the swing input operation has been performed for only the first operation device.

By this configuration, at timing when the swing input determination has been performed for the first operation device, the one-hand swing is determined and one-hand swing gaming processing can be executed. Therefore, there is no case of generating a delay of the one-hand swing gaming processing to determine, even though timings of swing input operations of the plurality of operation devices slightly deviate from each other, the simultaneous swing.

According to a third aspect, in the gaming device according to the first or second aspect, the inertial sensor includes at least an acceleration sensor and the operation data includes at least acceleration data.

By this configuration, the swing input determination and the simultaneous swing determination can be performed on the basis of the acceleration given to the operation device.

According to a fourth aspect, in the gaming device according to the third aspect, the swing input determination unit determines that each operation device entered the swing state at least when a change of acceleration shown by the acceleration data becomes a first threshold or more, for each of the operation devices.

By this configuration, when there is a sign of the swing input operation, it can be determined that the operation device entered the swing state.

According to a fifth aspect, in the gaming device according to the third aspect, the swing input determination unit determines that each operation device entered the swing state at least when a magnitude of acceleration shown by the acceleration data becomes a second threshold or more, for each of the operation devices.

By this configuration, when the acceleration of the sufficient magnitude is given to the operation device, the swing state can be determined.

According to a sixth aspect, in the gaming device according to the third aspect, the swing input determination unit determines that each operation device entered the swing state when a change of acceleration shown by the acceleration data becomes a first threshold or more and then a magnitude of the acceleration becomes a second threshold or more, for each of the operation devices.

By this configuration, when the acceleration of the sufficient magnitude is given to the operation device after there is the sign of the swing input, the swing state can be determined.

According to a seventh aspect, in the gaming device according to the third aspect, the swing input determination unit determines that the swing input operation has been performed when a change of acceleration shown by the acceleration data becomes 0 or a third threshold or less, for each of the operation devices.

By this configuration, the swing input determination unit performs the swing determination at timing when a movement of the operation device reaches a peak (for example, the acceleration is maximum or the angular velocity is maximum) or near timing, and this timing is close to timing when an object is separated (released) from a hand of a user in an operation for throwing the object by the user. Therefore, the one-hand swing gaming processing or the simultaneous swing gaming processing can be executed at timing when the user seems to throw the object by an operation for swing the operation device.

According to an eighth aspect, in the gaming device according to the first or second aspect, the inertial sensor includes at least an angular velocity sensor, and the operation data includes at least angular velocity data.

By this configuration, the swing input determination and the simultaneous swing determination can be performed on the basis of the angular velocity given to the operation device.

According to a ninth aspect, in the gaming device according to the first or second aspect, the gaming device further comprises: a swing direction determination unit that determines a swing direction, on the basis of the operation data, for each of the operation devices, wherein the gaming processing unit executes the gaming processing, on the basis of the swing direction.

By this configuration, gaming processing according to the swing direction can be executed.

According to a tenth aspect, in the gaming device according to the ninth aspect, the inertial sensor includes at least an acceleration sensor and an angular velocity sensor, and the operation data includes at least acceleration data and angular velocity data, the swing input determination unit determines that each operation device entered the swing state and that the swing input operation has been performed, on the basis of the acceleration data, and the swing direction determination unit determines the swing direction, on the basis of the angular velocity data.

By this configuration, the swing determination can be performed using the acceleration data and the swing direction determination can be performed using the angular velocity data.

According to an eleventh aspect, in the gaming device according to the tenth aspect, the gaming device further comprises: a posture calculation unit that calculates a posture of each of the operation devices, on the basis of at least the angular velocity data, wherein the swing direction determination unit determines the swing direction, on the basis of the posture.

By this configuration, even if the user possesses the operation device at any posture, a swing direction such as a horizontal direction and a vertical direction with respect to the user can be determined.

According to a twelfth aspect, in the gaming device according to any of the fourth to seventh aspects and the tenth to twelfth aspects, the gaming device further comprises: a smoothing processing unit that calculates a moving average of the acceleration data, wherein the swing input determination unit determines the swing state and performance of the swing input operation, on the basis of the moving average.

By this configuration, an actual movement of the operation device is smoothened and a sudden noise is removed. Therefore, the possibility that the swing input determination unit performs the determination that the user does not intend can be reduced.

According to a thirteenth aspect, there is provided a gaming device comprising: an operation data acquisition unit that acquires operation data including at least acceleration data from each of a plurality of operation devices each including an acceleration sensor; a swing input determination unit that determines that a swing input is performed on the basis of the acceleration data, for each of the operation devices; and a gaming processing unit that executes gaming processing on the basis of determination in the swing input determination unit, wherein, when it is determined that the swing input has been performed for a first operation device among the plurality of operation devices and a change of acceleration of a second operation device among the plurality of operation devices becomes a fourth threshold or more and then a magnitude of the acceleration of the second operation device becomes a fifth threshold or more, the swing input determination unit determines that the swing input has been performed for the second operation device at the same time as the first operation device.

By this configuration, in simultaneous swing inputs in which the plurality of operation devices are simultaneously swung, even when a deviation is generated in timings of swing inputs of the plurality of operation devices, the swing input determination unit determines the simultaneous swing of the plurality of operation devices at timing of the swing input determination of the operation device swung earlier. As a result, the user does not feel a delay of simultaneous swing gaming processing. In addition, the swing input determination unit determines that the operation device entered the swing state and that the swing input operation has been performed for the operation device. When the swing input determination has been performed for a first operation device and a second operation device is in the swing state, the swing input determination unit determines the simultaneous swing. Therefore, one-hand swing and simultaneous swing can be distinguished at timing when the swing input determination is performed for the first operation device, without waiting for performance of the swing input operation for the second operation devices.

According to a fourteenth aspect, in the gaming device according to the thirteenth aspect, when a change of acceleration shown by the acceleration data becomes a first threshold or more and then a magnitude of the acceleration becomes a second threshold or more and the change of the acceleration becomes 0 or a third threshold or less, the swing input determination unit determines that the swing input operation has been performed.

By this configuration, the one-hand swing gaming processing or the simultaneous swing gaming processing can be executed at timing when the user seems to throw the object by an operation for swing the operation device.

According to a fifteenth aspect, in the gaming device according to the thirteenth or fourteenth aspect, each of the plurality of operation devices further includes an angular velocity sensor, the operation data further includes angular velocity data, the gaming device further includes a swing direction determination unit that determines a swing direction of each of the operation devices, on the basis of the angular velocity data, and the gaming processing unit executes the gaming processing, on the basis of the swing direction.

By this configuration, gaming processing according to the swing direction can be executed.

According to a sixteenth aspect, there is provided a gaming system comprising at least a plurality of operation devices, wherein each of the plurality of operation devices includes at least an inertial sensor and outputs operation data including at least data obtained from the inertial sensor, the gaming system further comprises: a swing input determination unit that, for each of the operation devices, determines that each operation device entered a swing state in which each operation device is being swung and that a swing input operation for each operation device has been performed, on the basis of the operation data; and a gaming processing unit that executes gaming processing on the basis of determination in the swing input determination unit, and when it is determined that the swing input operation has been performed for a first operation device among the plurality of operation devices and a second operation device among the plurality of operation devices is in the swing state, the swing input determination unit determines that the swing input operation has been performed for the second operation device.

By this configuration, in simultaneous swing inputs in which the plurality of operation devices are simultaneously swung, even when a deviation is generated in timings of swing inputs of the plurality of operation devices, the swing input determination unit determines the simultaneous swing of the plurality of operation devices at timing of the swing input determination of the operation device swung earlier. As a result, the user does not feel a delay of simultaneous swing gaming processing. In addition, the swing input determination unit determines that the operation device entered the swing state and that the swing input operation has been performed for the operation device. When the swing input determination has been performed for a first operation device and a second operation device is in the swing state, the swing input determination unit determines the simultaneous swing. Therefore, one-hand swing and simultaneous swing can be distinguished at timing when the swing input determination is performed for one operation device, without waiting for performance of the swing input operation for the second operation device.

According to a seventeenth aspect, there is provided a non-transitory storage medium having stored therein a gaming program causing a gaming device to perform: operation data acquisition acquiring operation data including at least data of an inertial sensor from a plurality of operation devices each including at least the inertial sensor; swing input determination, for each of the operation devices, determining that each operation device entered a swing state in which each operation device is being swung and that a swing input operation for each operation device has been performed, on the basis of the operation data; and gaming processing executed on the basis of determination in the swing input determination, wherein, when it is determined that the swing input operation has been performed for a first operation device among the plurality of operation devices and a second operation device among the plurality of operation devices is in the swing state, the swing input determination determines that the swing input operation has been performed for the second operation device.

By this configuration, in simultaneous swing inputs in which the plurality of operation devices are simultaneously swung, even when a deviation is generated in timings of swing inputs of the plurality of operation devices, the swing input determination unit determines the simultaneous swing of the plurality of operation devices at timing of the swing input determination of the operation device swung earlier. As a result, the user does not feel a delay of simultaneous swing gaming processing. In addition, the swing input determination unit determines that the operation device entered the swing state and that the swing input operation has been performed for the operation device. When the swing input determination is performed for a first operation device and a second operation device is in the swing state, the swing input determination unit determines the simultaneous swing. Therefore, one-hand swing and simultaneous swing can be distinguished at timing when the swing input determination is performed for the first operation device, without waiting for performance of the swing input operation for the second operation device.

According to an eighteenth aspect, there is provided a non-transitory storage medium having stored therein a gaming program causing a gaming device to perform: operation data acquisition acquiring operation data including at least acceleration data from each of a plurality of operation devices each including an acceleration sensor; swing input determination determining that a swing input operation has been performed on the basis of the acceleration data, for each of the operation devices; and gaming processing executed on the basis of determination in the swing input determination, wherein, when it is determined that the swing input operation has been performed for a first operation device among the plurality of operation devices and change of acceleration of a second operation device among the plurality of operation devices becomes a fourth threshold or more and then a magnitude of the acceleration of the second operation device becomes a fifth threshold or more, the swing input determination unit determines that the swing input operation has been performed for the second operation device at the same time as the first operation device.

By this configuration, in simultaneous swing inputs in which the plurality of operation devices are simultaneously swung, even when a deviation is generated in timings of swing inputs of the plurality of operation devices, the swing input determination unit determines the simultaneous swing of the plurality of operation devices at timing of the swing input determination of the operation device swung earlier. As a result, the user does not feel a delay of simultaneous swing gaming processing. In addition, the swing input determination unit determines that the operation device entered the swing state and that the swing input operation has been performed for the operation device. When the swing input determination has been performed for a first operation device and a second operation device is in the swing state, the swing input determination unit determines the simultaneous swing. Therefore, one-hand swing and simultaneous swing can be distinguished at timing when the swing input determination has been performed for the first operation device, without waiting for performance of the swing input operation for the second operation device.

According to a nineteenth aspect, in the non-transitory storage medium having stored therein a gaming program according to the eighteenth aspect, when a change of acceleration shown by the acceleration data becomes a first threshold or more and then a magnitude of the acceleration becomes a second threshold or more and the change of the acceleration becomes 0 or a third threshold or less, the swing input determination determines that the swing input operation has been performed.

By this configuration, the one-hand swing gaming processing or the simultaneous swing gaming processing can be executed at timing when the user seems to throw the object by an operation for swing the operation device.

According to a twentieth aspect, in the non-transitory storage medium having stored therein a gaming program according to the eighteenth or nineteenth aspect, each of the plurality of operation devices further includes an angular velocity sensor, the operation data further includes angular velocity data, the gaming program causes the gaming device to perform swing direction determination determining a swing direction of each of the operation devices, on the basis of the angular velocity data, and the gaming processing is executed on the basis of the swing direction.

By this configuration, gaming processing according to the swing direction can be executed.

According to a twenty-first aspect, there is provided a swing input determination method including: an operation data acquisition step of acquiring operation data including at least data of an inertial sensor from a plurality of operation devices each including at least the inertial sensor; and a swing input determination step of, for each of the operation devices, determining that each operation device entered a swing state in which each operation device is being swung and that a swing input operation for each operation device has been performed, on the basis of the operation data, wherein, when it is determined that the swing input operation has been performed for a first operation device among the plurality of operation devices and a second operation devices among the plurality of operation devices is in the swing state, the swing input determination step determines that the swing input operation has been performed for the second operation device.

By this configuration, in simultaneous swing inputs in which the plurality of operation devices are simultaneously swung, even when a deviation is generated in timings of swing inputs of the plurality of operation devices, the simultaneous swing of the plurality of operation devices can be determined at timing of the swing input determination of the operation device swung earlier. In addition, the swing input determination step determines that the operation device entered the swing state and that the swing input operation has been performed for the operation device. When the swing input determination has been performed for a first operation device and a second operation device is in the swing state, the swing input determination unit determines the simultaneous swing. Therefore, one-hand swing and simultaneous swing can be distinguished at timing when the swing input determination has been performed for the first operation device, without waiting for performance of the swing input operation for the second operation device.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Hereinafter, an embodiment of the present disclosure will be described with reference to the drawings. The embodiment described below is an example when the present disclosure is carried out and the present disclosure is not limited to a specific configuration described below. When the present disclosure is carried out, a specific configuration according to the embodiment may be appropriately adopted.

[Entire Configuration of Gaming System]

Figure 1:
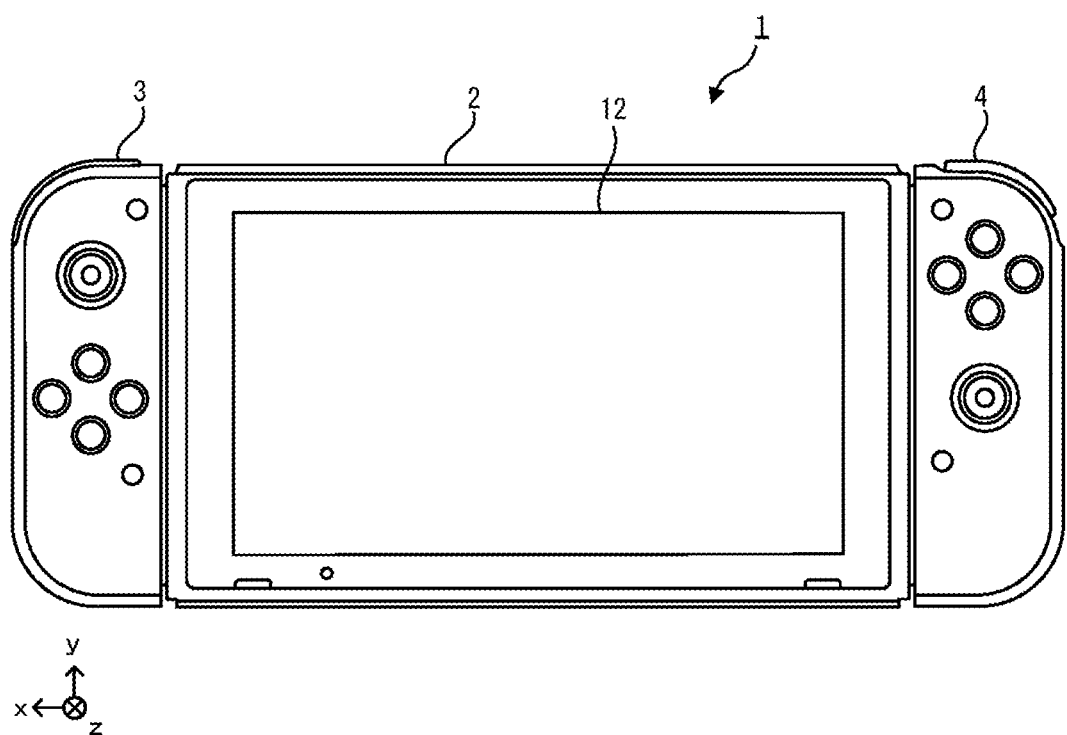
FIG. 1 is a diagram illustrating an entire configuration of an example of a gaming system according to an embodiment.

FIG. 1 is a diagram illustrating an entire configuration of an example of a gaming system 1 according to the embodiment. The gaming system 1 is configured to include a body device (gaming device) 2 to be an information processing device. The gaming system 1 may include a function of information processing other than a game, for example, a function such as a web browser, moving picture reproduction, and communication and the body device may execute this function. The gaming system 1 according to this embodiment includes a left controller 3 and a right controller 4 functioning as operation devices, in addition to the body device 2 functioning as the gaming device.

In the example of FIG. 1, the left controller 3 and the right controller 4 are mounted on the body device 2. The left controller 3 and the right controller 4 are mounted on the body device 2 and are integrated. The body device 2 is a device that executes various processing in the gaming system 1. The body device 2 includes a display 12. Each of the left controller 3 and the right controller 4 is an operation device that includes an operation member to allow a user to perform an input.

Figure 2:
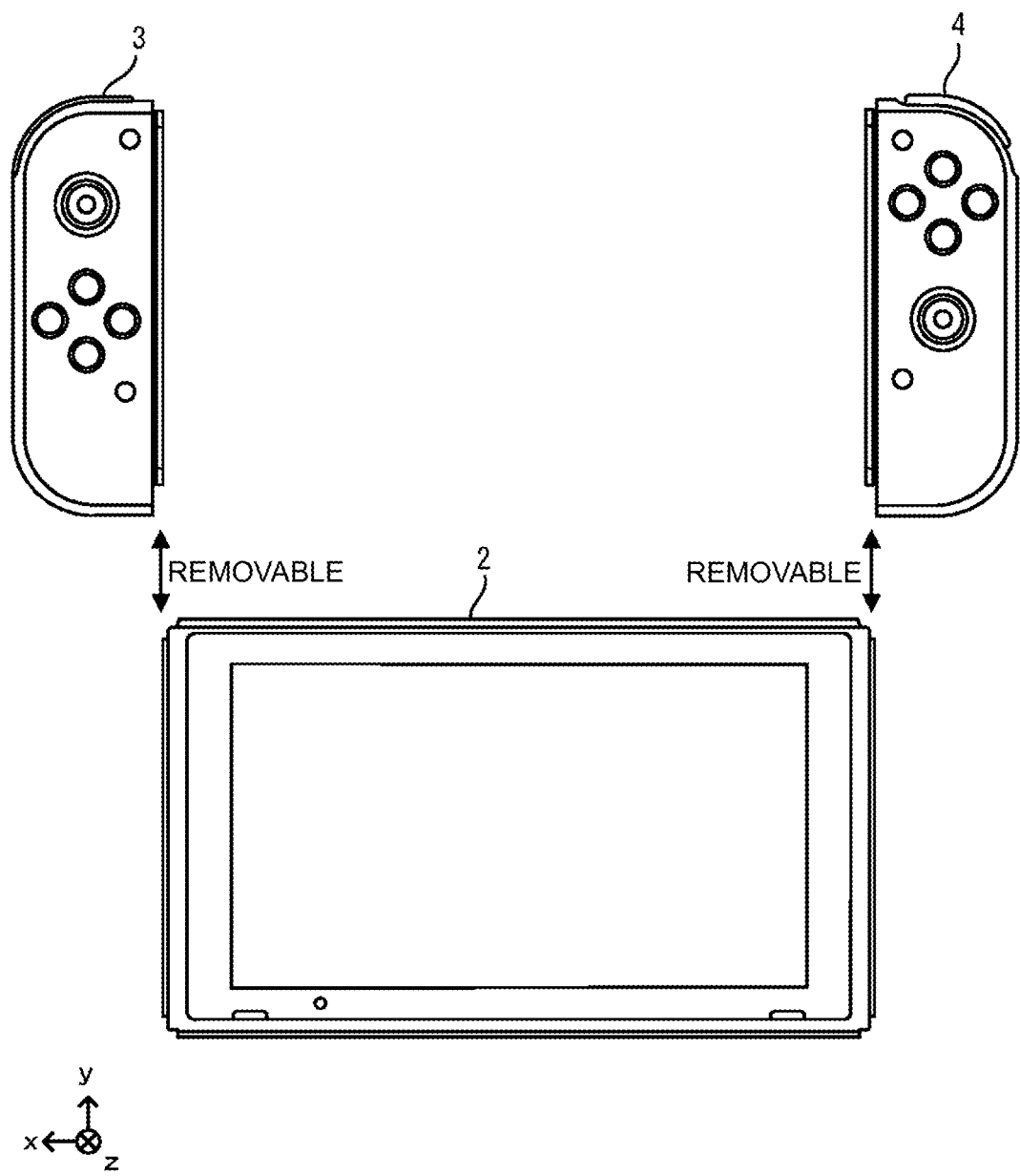
FIG. 2 is a diagram illustrating an entire configuration of an example of the gaming system according to the embodiment.

FIG. 2 is a diagram illustrating an example of a state in which the left controller 3 and the right controller 4 are removed from the body device 2. As illustrated in FIGS. 1 and 2, the left controller 3 and the right controller 4 are removable from the body device 2. The left controller 3 can be mounted on a left side surface (side surface of an x-axis positive direction side illustrated in FIG. 1) of the body device 2 and can be removed from the body device 2 by sliding the left controller 3 in a y-axis direction illustrated in FIG. 1 along the left side surface of the body device 2. In addition, the right controller 4 can be mounted on a right side surface (side surface of an x-axis negative direction side illustrated in FIG. 1) of the body device 2 and can be removed from the body device 2 by sliding the right controller 4 in the y-axis direction illustrated in FIG. 1 along the right side surface of the body device 2. The left controller 3 and the right controller 4 may be generically described as "controllers" hereinafter.

Figure 3:
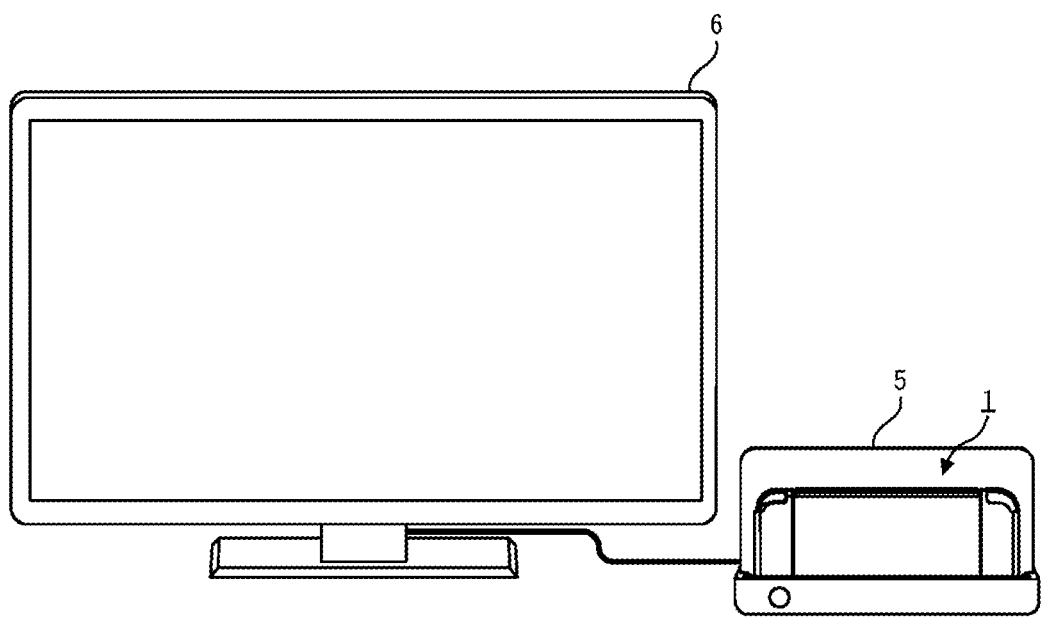
FIG. 3 is a diagram illustrating an entire configuration of another example of the gaming system according to the embodiment.

FIG. 3 is a diagram illustrating an entire configuration of another example of the gaming system according to this embodiment. As illustrated in FIG. 3, the gaming system 1 may further include a cradle 5. As an example, the cradle 5 can mount an integrated device in which the left controller 3 and the right controller 4 are mounted on the body device 2. As another example, the cradle 5 can mount only the body device 2 in a state in which the left controller 3 and the right controller 4 are removed from the body device 2.

In addition, the cradle 5 can perform communication with a stationary monitor 6 (for example, a stationary TV monitor) to be an example of an external display separated from the display 12 (the cradle 5 may perform wired communication or may perform wireless communication). Although described in detail below, when the integrated device or a single body of the body device 2 is mounted on the cradle 5, the gaming system 1 can display an image acquired or generated by the body device 2 on the stationary monitor 6. In addition, in this embodiment, the cradle 5 has a function of charging the integrated device or the single body of the body device 2 mounted. In addition, the cradle 5 has a function of a hub device (specifically, a USB hub).

Figure 4:
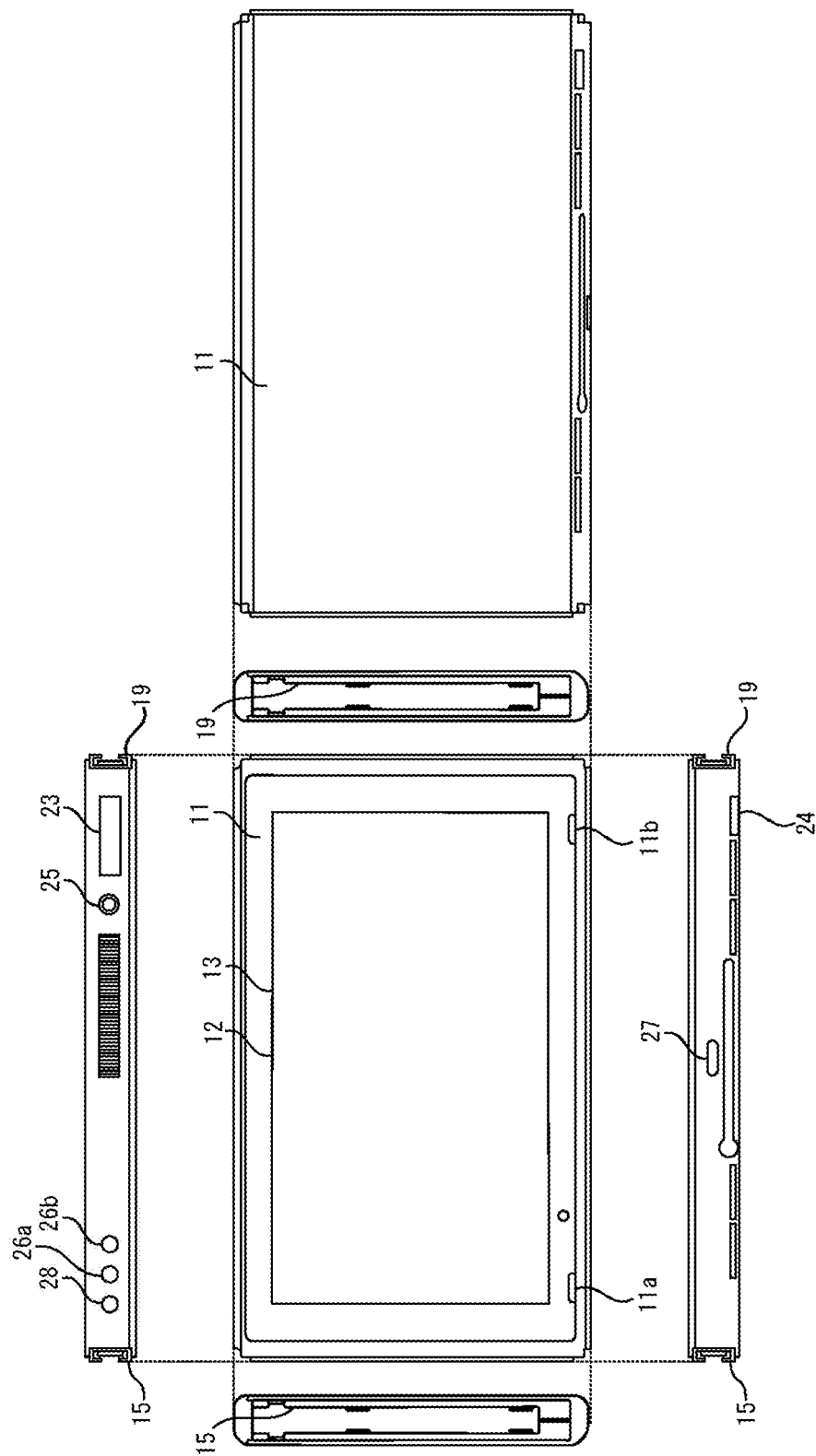
FIG. 4 is a six-sided view illustrating a configuration of an example of a body device according to the embodiment.

FIG. 4 is a six-sided view illustrating an example of the body device 2. As illustrated in FIG. 4, the body device 2 includes an approximately plate-shaped housing 11. In this embodiment, a principal surface (in other words, a surface, that is, a surface provided with the display 12) of the housing 11 has an approximately rectangular shape. In this embodiment, it is assumed that the housing 11 has a horizontally long shape. That is, in this embodiment, a longitudinal direction (that is, an x-axis direction illustrated in FIG. 1) of the principal surface of the housing 11 is called a transverse direction (also called a horizontal direction), a short direction (that is, the y-axis direction illustrated in FIG. 1) of the principal surface is called a longitudinal direction (also called a vertical direction), and a direction (that is, a z-axis direction illustrated in FIG. 1) vertical to the principal surface is called a depth direction (also called an anteroposterior direction). The body device 2 can be used in a direction where the body device 2 is horizontally long. In addition, the body device 2 can be used in a direction where the body device 2 is vertically long. In this case, it may be assumed that the housing 11 has a vertically long shape.

A shape and a size of the housing 11 are arbitrary. As an example, the housing 11 may have a portable size. In addition, the single body of the body device 2 or the integrated device in which the left controller 3 and the right controller 4 are mounted on the body device 2 may be a portable device. In addition, the body device 2 or the integrated device may be a handheld device. In addition, the body device 2 or the integrated device may be a mobile device.

As illustrated in FIG. 4, the body device 2 includes the display 12 that is provided on the principal surface of the housing 11. The display 12 displays an image (it may be a still image and may be a moving image) acquired or generated by the body device 2. In this embodiment, the display 12 is a liquid crystal display (LCD). However, the display 12 may be any kind of display.

In addition, in the body device 2, a touch panel 13 is integrated with the display 12 and a touch display is configured. In this embodiment, the touch panel 13 is a touch panel of a type (for example, a capacitive type) enabling a multi-touch input. However, the touch panel 13 may be any kinds of touch panel, for example, a touch panel of a type (for example, a resistive film type) enabling a single touch input.

The body device 2 includes a speaker (that is, a speaker 88 illustrated in FIG. 8) in the housing 11. As illustrated in FIG. 4, speaker holes 11a and 11b are formed in the principal surface of the housing 11. In addition, output sounds of the speaker 88 are output from the speaker holes 11a and 11b.

The body device 2 includes a left rail member 15 on a left side surface of the housing 11. The left rail member 15 is a member to removably mount the left controller 3 on the body device 2. The left rail member 15 is provided on the left side surface of the housing 11 to extend along a vertical direction. The left rail member 15 has a shape enabling an engagement with a slider (that is, a slider 310 illustrated in FIG. 5) of the left controller 3 and a slide mechanism is formed by the left rail member 15 and the slider 310. By the slide mechanism, the left controller 3 can be mounted on the body device 2 to be slidable and removable. A lower end of the left rail member 15 and the housing 11 configure a pocket and a left terminal 17 (refer to FIG. 8) is provided in the pocket.

A right side surface of the housing 11 is provided with the same configuration as the configuration provided on the left side surface. That is, the body device 2 includes a right rail member 19 on the right side surface of the housing 11. The right rail member 19 is provided on the right side surface of the housing 11 to extend along a vertical direction. The right rail member 19 has a shape enabling an engagement with a slider (that is, a slider 330 illustrated in FIG. 6) of the right controller 4 and a slide mechanism is formed by the right rail member 19 and the slider 330. By the slide mechanism, the right controller 4 can be mounted on the body device 2 to be slidable and removable. A lower end of the right rail member 19 and the housing 11 configure a pocket and a right terminal 21 (refer to FIG. 8) is provided in the pocket.

The body device 2 includes a first slot 23. The first slot 23 is provided on an upper side surface of the housing 11. The first slot 23 has a shape in which a first kind of storage medium can be mounted. The first kind of storage medium is a dedicated storage medium (for example, a dedicated memory card) for the gaming system 1 and a gaming device of the same kind as the gaming system 1, for example. The first kind of storage medium is used to store data (for example, saved data of an application) used by the body device 2 and/or a program (for example, a program of an application) executed by the body device 2. In addition, the body device 2 includes a power supply button 28. As illustrated in FIG. 4, the power supply button 28 is provided on the upper side surface of the housing 11. The power supply button 28 is a button to switch on/off of a power supply of the body device 2.

The body device 2 includes a voice input/output terminal (specifically, an earphone jack) 25. That is, the body device 2 can mount a microphone or an earphone on the voice input/output terminal 25. The voice input/output terminal 25 is provided on the upper side surface of the housing 11.

The body device 2 includes volume buttons 26a and 26b. The volume buttons 26a and 26b are provided on the upper side surface of the housing 11. The volume buttons 26a and 26b are buttons to command adjustment of volumes of sounds output by the body device 2. That is, the volume button 26a is a button to command a volume decrease and the volume button 26b is a button to command a volume increase.

The body device 2 includes a lower terminal 27. The lower terminal 27 is a terminal to allow the body device 2 to perform communication with the cradle 5 to be described below. The lower terminal 27 is provided on a lower side surface of the housing 11. When the body device 2 is mounted on the cradle 5, the lower terminal 27 is connected to a terminal (body terminal 73 illustrated in FIG. 7) of the cradle 5. In this embodiment, the lower terminal 27 is a USB connector (more specifically, a female-side connector).

In addition, the body device 2 includes a second slot 24. In this embodiment, the second slot 24 is provided on the lower side surface of the housing 11. However, in other embodiment, the second slot 24 may be provided on the same surface as the first slot 23. The second slot 24 has a shape in which a storage medium of a second kind different from the first kind can be mounted. The second kind of storage medium may be a versatile storage medium. For example, the second kind of storage medium may be an SD card. Similar to the first kind of storage medium, the second kind of storage medium is used to store data (for example, saved data of an application) used by the body device 2 and/or a program (for example, a program of an application) executed by the body device 2.

Shapes, numbers, and arrangement positions of the components (specifically, the buttons, the slots, and the terminals) provided in the housing 11, described above, are arbitrary. For example, in other embodiment, a part of the power supply button 28 and the slots 23 and 24 may be provided on other side surface or a back surface of the housing 11. In addition, in other embodiment, the body device 2 may have a configuration in which apart of the components is not included.

[Configuration of Left Controller]

Figure 5:
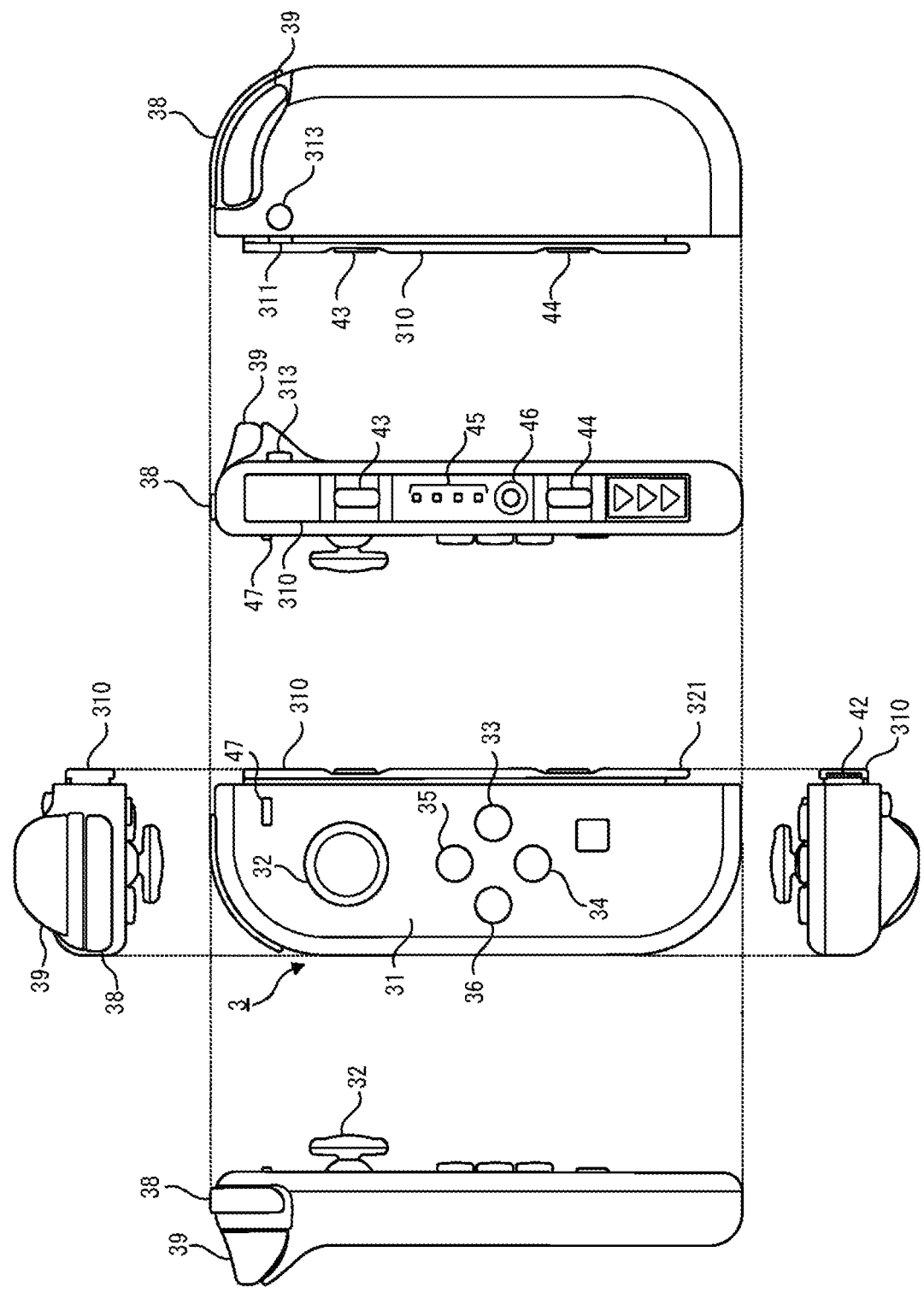
FIG. 5 is a six-sided view illustrating a configuration of an example of a left controller according to the embodiment.

FIG. 5 is a six-sided view illustrating an example of the left controller 3. As illustrated in FIG. 5, the left controller 3 includes a housing 31. In this embodiment, the housing 31 has an approximately plate shape. In addition, a principal surface (in other words, a surface, that is, a surface of a z-axis negative direction side illustrated in FIG. 1) of the housing 31 has an approximately rectangular shape. In addition, in this embodiment, the housing 31 has a vertically long shape, that is, a shape long in a vertical direction (that is, the y-axis direction illustrated in FIG. 1). The left controller 3 can be gripped in a direction where the left controller 3 is vertically long, in a state in which the left controller 3 is removed from the body device 2. The housing 31 has a shape and a size in which the left controller 3 can be gripped by one hand, particularly, a left hand, when the left controller 3 is gripped in the direction where the left controller 3 is vertically long.

In addition, the left controller 3 can be gripped in a direction where the left controller 3 is horizontally long. The left controller 3 may be gripped by both hands, when the left controller 3 is gripped in the direction where the left controller 3 is horizontally long. A shape of the housing 31 is arbitrary. In other embodiment, the housing 31 may not have an approximately plate shape. In addition, the housing 31 may not have a rectangular shape and may have a semicircular shape. In addition, the housing 31 may not have a vertically long shape.

A length of the vertical direction of the housing 31 is almost the same as a length of the vertical direction of the housing 11 of the body device 2. In addition, a thickness (that is, a length of the anteroposterior direction, in other words, a length of the z-axis direction illustrated in FIG. 1) of the housing 31 is almost the same as a thickness of the housing 11 of the body device 2. Therefore, when the left controller 3 is mounted on the body device 2 (refer to FIG. 1), a user can grip the body device 2 and the left controller 3 by a sense like an integrated device.

In addition, the principal surface of the housing 31 has a shape in which a left angular portion is more rounded than a right angular portion. That is, a connection portion of the upper side surface and the left side surface of the housing 31 and a connection portion of the lower side surface and the left side surface of the housing 31 are more rounded than a connection portion of the upper side surface and the right side surface thereof and a connection portion of the lower side surface and the right side surface thereof (in other words, R in chamfering is large). Therefore, in the case in which the left controller 3 is mounted on the body device 2 (refer to FIG. 1), because the left side of the gaming system 1 having become the integrated device has a round shape, the gaming system 1 can be easily gripped by the user.

The left controller 3 includes an analog stick 32. The analog stick 32 is provided on the principal surface of the housing 31. The analog stick 32 is an example of a direction operation member that can input a direction. The analog stick 32 has a stick member that can be tilted in all directions (that is, directions of 360° including vertical and horizontal directions and an oblique direction) parallel to the principal surface of the housing 31. The user tilts the stick member, so that an input of a direction according to a tilting direction (and an input of a magnitude according to a tilting angle) is enabled.

The direction operation member may be a cross key or a slide stick. In addition, in this embodiment, a pressing input of the stick member (in a direction vertical to the housing 31) is enabled. That is, the analog stick 32 is an input unit that can perform an input of a direction and a magnitude according to a tilting direction and a tilting amount of the stick member and a pressing input for the stick member.

The left controller 3 includes four operation buttons 33 to 36 (specifically, a rightward button 33, a downward button 34, an upward button 35, and a leftward button 36). As illustrated in FIG. 5, the four operation buttons 33 to 36 are provided below the analog stick 32 on the principal surface of the housing 31.

In this embodiment, the four operation buttons are provided on the principal surface of the left controller 3. However, the number of operation buttons is arbitrary. The operation buttons 33 to 36 are used to give commands according to various programs (for example, an OS program and an application program) executed by the body device 2. In addition, in this embodiment, because the operation buttons 33 to 36 may be used to input directions, the operation buttons 33 to 36 are called the rightward button 33, the downward button 34, the upward button 35, and the leftward button 36, respectively. However, the operation buttons 33 to 36 may be used to give commands other than the direction input.

In addition, the left controller 3 includes a − (minus) button 47. As illustrated in FIG. 5, the − button 47 is provided on the principal surface of the housing 31. More specifically, the − button 47 is provided in an upper right region on the principal surface. The − button 47 is used to give commands according to various programs (for example, an OS program and an application program) executed by the body device 2.

When the left controller 3 is mounted on the body device 2, the individual operation members (specifically, the analog stick 32 and the individual buttons 33 to 36 and 47) provided on the principal surface of the left controller 3 are operated by a thumb of a left hand of the user who grips the gaming system 1 having become the integrated device. In addition, when the left controller 3 is gripped sideways by both hands and is used, in a state in which the left controller 3 is removed from the body device 2, the individual operation units are operated by thumbs of the left and right hands of the user who grips the left controller 3. Specifically, in this case, the analog stick 32 is operated by the thumb of the left hand of the user and the individual operation buttons 33 to 36 are operated by the thumb of the right hand of the user.

The left controller 3 includes an L button 38 and a ZL button 39. These operation buttons 38 and 39 are used to give commands according to various programs executed by the body device 2, similar to the operation buttons 33 to 36. As illustrated in FIG. 5, the L button 38 is provided in an upper left portion of the side surface of the housing 31. In addition, the ZL button 39 is provided in an upper left portion (specifically, an upper left portion when the housing 31 is viewed from the surface side) from the side surface of the housing 31 to the back surface thereof. That is, the ZL button 39 is provided at the rear side (z-axis positive direction side illustrated in FIG. 1) of the L button 38.

In this embodiment, because the upper left portion of the housing 31 has a round shape, the L button 38 and the ZL button 39 have a round shape according to the round shape of the upper left portion of the housing 31. When the left controller 3 is mounted on the body device 2, the L button 38 and the ZL button 39 are disposed in an upper left portion in the gaming system 1 having become the integrated device.

The left controller 3 includes a slider 310. The slider 310 is provided on a right side surface of the housing 31 to extend in the vertical direction. The slider 310 has a shape enabling an engagement with the left rail member 15 (more specifically, a groove of the left rail member 15) of the body device 2. Therefore, the slider 40 engaging with the left rail member 15 is fixed in a direction vertical to a slide direction (in other words, an extension direction of the left rail member 15) and is not removed.

An engagement piece 321 slightly separated from the right side surface of the housing 31 is formed in a lower end of the slider 310 and the left controller 3 includes a terminal 42 to perform wired communication with the body device 2, at the back side (x-axis positive direction side illustrated in FIG. 1) of the engagement piece 321. When the left controller 3 is mounted on the body device 2, the engagement piece 321 is fitted into the pocket formed in the lower end of the left rail member 15 and the terminal 42 contacts the left terminal 17 of the body device 2. The terminal 42 and the left terminal 17 may be provided at positions where the terminal 42 and the left terminal 17 contact each other when the left controller 3 is mounted on the body device 2 and specific positions thereof are arbitrary. In this embodiment, even in a state in which the left controller 3 is removed from the body device 2, the terminal 42 and the left terminal 17 are prevented from being exposed to the outside, by the above arrangement.

Operation buttons 43 and 44 are provided on the right side surface (that is, a surface facing the right side surface of the body device 2 when the left controller 3 is mounted on the body device 2) of the left controller 3. In addition, an LED 45 for a notification and a pairing button 46 are provided. The operation buttons 43 and 44 are buttons used in the same way as an L button and an R button, when the user grips the left controller 3 by both hands and operates the left controller 3. The pairing button 46 is a button to command execution of pairing of wireless communication with the body device 2, when the left controller 3 is removed from the body device 2 and is used. The LED 45 for the notification includes four LED lamps and various kinds of information, particularly; a status of the left controller 3 is displayed by a combination of turning on and turning off of the LED lamps. For example, in a game where a plurality of players operate the left controller 3 or the right controller 4 one by one, the LED 45 for the notification can show what number player the controller corresponds to.

A lock release button 311 is provided on the back surface of the left controller 3. If the lock release button 311 is pressed in a state in which the left controller 3 is mounted on the body device 2, as illustrated in FIG. 2, the left controller 3 can be slid upward. As a result, the left controller 3 locked in a mounting state can be separated from the body device 2.

[Configuration of Right Controller]

Figure 6:
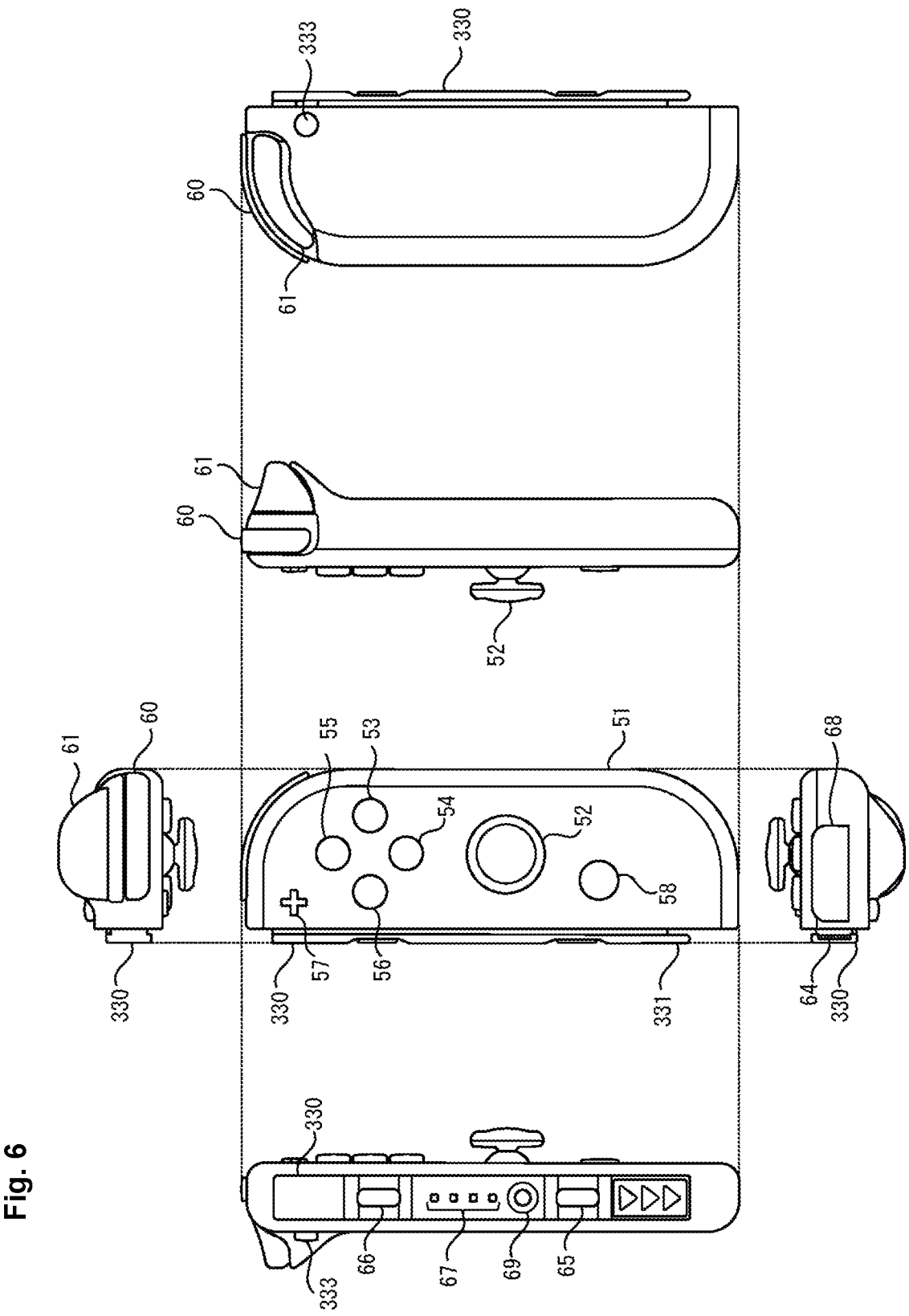
FIG. 6 is a six-sided view illustrating a configuration of an example of a right controller according to the embodiment.

FIG. 6 is a six-sided view illustrating an example of the right controller 4. As illustrated in FIG. 6, the right controller 4 includes a housing 51. In this embodiment, the housing 51 has an approximately plate shape. In addition, a principal surface (in other words, a surface, that is, a surface of the z-axis negative direction side illustrated in FIG. 1) of the housing 51 has an approximately rectangular shape. In addition, in this embodiment, the housing 51 has a vertically long shape, that is, a shape long in a vertical direction.

The right controller 4 can be gripped in a direction where the right controller 4 is vertically long, in a state in which the right controller 4 is removed from the body device 2. The housing 51 has a shape and a size in which the right controller 4 can be gripped by one hand, particularly, a right hand, when the right controller 4 is gripped in the direction where the right controller 4 is vertically long. In addition, the right controller 4 can be gripped in a direction where the right controller 4 is horizontally long. The right controller 4 may be gripped by both hands, when the right controller 4 is gripped in the direction where the right controller 4 is horizontally long.

In the housing 51 of the right controller 4, a length of the vertical direction thereof is almost the same as a length of the vertical direction of the housing 11 of the body device 2 and a thickness thereof is almost the same as a thickness of the housing 11 of the body device 2, similar to the housing 31 of the left controller 3. Therefore, when the right controller 4 is mounted on the body device 2 (refer to FIG. 1), the user can grip the body device 2 and the right controller 4 by a sense like an integrated device.

In addition, the principal surface of the housing 51 has a shape in which a right angular portion is more rounded than a left angular portion, as illustrated in FIG. 6. That is, a connection portion of an upper side surface and a right side surface of the housing 51 and a connection portion of a lower side surface and the right side surface of the housing 51 are more rounded than a connection portion of the upper side surface and a left side surface thereof and a connection portion of the lower side surface and the left side surface thereof (in other words, R in chamfering is large). Therefore, in the case in which the right controller 4 is mounted on the body device 2 (refer to FIG. 1), because the right side of the gaming system 1 having become the integrated device has a round shape, the gaming system 1 can be easily gripped by the user.

The right controller 4 includes an analog stick 52 as a direction operation member, similar to the left controller 3. In this embodiment, the analog stick 52 has the same configuration as the analog stick 32 of the left controller 3. In addition, the right controller 4 includes four operation buttons 53 to 56 (specifically, an A button 53, a B button 54, an X button 55, and a Y button 56), similar to the left controller 3. In this embodiment, the four operation buttons 53 to 56 are the same mechanisms as the four operation buttons 33 to 36 of the left controller 3. As illustrated in FIG. 6, the analog stick 52 and the operation buttons 53 to 56 are provided on the principal surface of the housing 51. In this embodiment, the four operation buttons are provided on the principal surface of the right controller 4. However, the number of operation buttons is arbitrary.

In this embodiment, in the right controller 4, the analog stick 52 is disposed below the operation buttons 53 to 56. That is, a position relation of the two kinds of operation members (the analog stick and the operation buttons) in the right controller 4 is opposite to a position relation of the two kinds of operation members in the left controller 3. By the above arrangement, when the left controller 3 and the right controller 4 are removed from the body device 2 and are used by both hands, the analog sticks become the left side and the buttons become the right side, so that the left controller 3 and the right controller 4 can be used by similar operation senses.

In addition, the right controller 4 includes a + (plus) button 57. As illustrated in FIG. 6, the + button 57 is provided on the principal surface of the housing 51. More specifically, the + button 57 is provided in an upper left region on the principal surface. The + button 57 is used to give commands according to various programs (for example, an OS program and an application program) executed by the body device 2, similar to other operation buttons 53 to 56.

The right controller 4 includes a home button 58. As illustrated in FIG. 6, the home button 58 is provided on the principal surface of the housing 51. More specifically, the home button 58 is provided in a lower left region of the principal surface. The home button 58 is a button to display a predetermined menu screen on the display 12 of the body device 2. The menu screen is a screen that can start an application designated by the user from one or more applications executable in the body device 2, for example. The menu screen may be displayed when the body device 2 starts, for example.

In this embodiment, if the home button 58 is pressed in a state in which the application is executed in the body device 2 (that is, a state in which an image of the application is displayed on the display 12), a predetermined operation screen may be displayed on the display 12 (at this time, instead of the operation screen, the menu screen may be displayed). The operation screen is a screen that can give a command to end the application and display the menu screen on the display 12 and a command to resume the application, for example.

When the right controller 4 is mounted on the body device 2, the individual operation members (specifically, the analog stick 52 and the individual buttons 53 to 58) provided on the principal surface of the right controller 4 are operated by the thumb of the right hand of the user who grips the gaming system 1. In addition, when the right controller 4 is gripped sideways by both hands and is used, in a state in which the right controller 4 is removed from the body device 2, the individual operation members are operated by the thumbs of the left and right hands of the user who grips the right controller 4. Specifically, in this case, the analog stick 52 is operated by the thumb of the left hand of the user and the individual operation buttons 53 to 56 are operated by the thumb of the right hand of the user.

The right controller 4 includes an R button 60 and a ZR button 61. The R button 60 is provided in an upper right portion of the side surface of the housing 51. In addition, the ZR button 61 is provided in an upper right portion (specifically, an upper right portion when the housing 51 is viewed from the surface side) from the side surface of the housing 51 to the back surface thereof. That is, the ZR button 61 is provided at the rear side (z-axis positive direction side illustrated in FIG. 1) of the R button 60. In this embodiment, because the upper right portion of the housing 51 has a round shape, the R button 60 and the ZR button 61 have a round shape according to the round shape of the upper right portion of the housing 51. When the right controller 4 is mounted on the body device 2, the R button 60 and the ZR button 61 are disposed in an upper right portion in the gaming system 1.

The right controller 4 includes the same slider mechanism as the left controller 3. That is, the right controller 4 includes the slider 330. As illustrated in FIG. 6, the slider 330 is provided on a left side surface of the housing 51 to extend in the vertical direction. The slider 330 has a shape enabling an engagement with the right rail member 19 (more specifically, a groove of the right rail member 19) of the body device 2. Therefore, the slider 330 engaging with the right rail member 19 is fixed in a direction vertical to a slide direction (in other words, an extension direction of the right rail member 19) and is not removed.

An engagement piece 331 slightly separated from the left side surface of the housing 51 is formed in a lower end of the slider 330 and the right controller 4 includes a terminal 64 to perform wired communication with the body device 2, at the back side (x-axis negative direction side illustrated in FIG. 1) of the engagement piece 331. When the right controller 4 is mounted on the body device 2, the engagement piece 331 is fitted into the pocket formed in the lower end of the right rail member 19 and the terminal 64 contacts the right terminal 21 of the body device 2. The terminal 64 and the right terminal 21 may be provided at positions where the terminal 64 and the right terminal 21 contact each other when the right controller 4 is mounted on the body device 2 and specific positions thereof are arbitrary. In this embodiment, even in a state in which the right controller 4 is removed from the body device 2, the terminal 62 and the right terminal 21 are prevented from being exposed to the outside, by the above arrangement.

Operation buttons 65 and 66 are provided on the left side surface (that is, a surface facing the left side surface of the body device 2 when the right controller 4 is mounted on the body device 2) of the right controller 4. In addition, an LED 67 for a notification and a pairing button 69 are provided. The operation buttons 65 and 66 are buttons used in the same way as an L button and an R button, when the user grips the right controller 4 by both hands and operates the right controller 4. The pairing button 69 is a button to command execution of pairing of wireless communication with the body device 2, when the right controller 4 is removed from the body device 2 and is used. The LED 67 for the notification includes four LED lamps and various kinds of information, particularly; a status of the right controller 4 is displayed by a combination of turning on and turning off of the LED lamps. For example, in a game where a plurality of players operate the left controller 3 or the right controller 4 one by one, the LED 67 for the notification can show what number player the controller corresponds to.

In the left controller 3 and the right controller 4, shapes, numbers, and arrangement positions of the individual components (specifically, the sliders, the sticks, and the buttons) provided in the housings 31 and 51 are arbitrary. For example, in other embodiment, the left controller 3 and the right controller 4 may include a direction operation member of a kind different from a kind of the analog stick. In addition, the slider 310 or 330 may be disposed at a position according to a position of the rail member 15 or 19 provided in the body device 2 and may be disposed on the principal surface or the back surface of the housing 31 or 51. In addition, in other embodiment, the left controller 3 and the right controller 4 may have a configuration in which a part of the components is not included.

A lock release button 333 is provided on the back surface of the right controller 4. If the lock release button 333 is pressed in a state in which the right controller 4 is mounted on the body device 2, as illustrated in FIG. 2, the right controller 4 can be slid upward. As a result, the right controller 4 locked in a mounting state can be separated from the body device 2.

[Configuration of Cradle]

Figure 7:
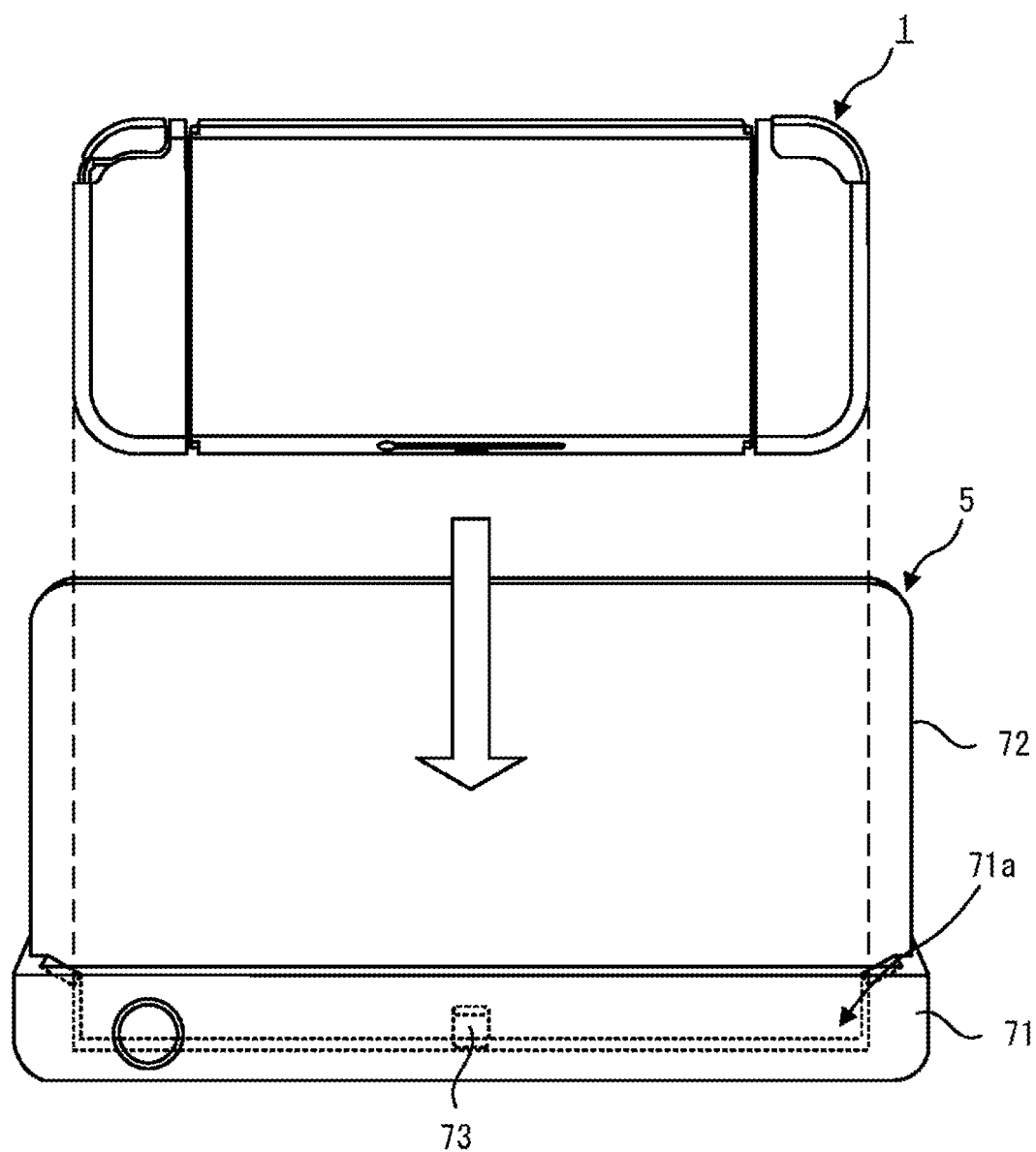
FIG. 7 is a six-sided view illustrating a configuration of an example of a cradle according to the embodiment.

FIG. 7 is a diagram illustrating an exterior configuration of an example of the cradle 5. The cradle 5 has a housing that can mount the body device 2 to be removable. In this embodiment, as illustrated in FIG. 7, the housing has a first support portion 71 that is provided with a groove 71a and a second support portion 72 that has an approximately planar shape.

The groove 71a formed in the first support portion 71 has a shape according to a shape of a lower portion of the integrated device. Specifically, the groove 71a has a shape enabling insertion of the lower portion of the integrated device. More specifically, the groove 71a has a shape almost matched with the shape of the lower portion of the body device 2. Therefore, the lower portion of the integrated device is inserted into the groove 71a, so that the integrated device can be mounted on the cradle 5.

In addition, the second support portion 72 supports a surface (that is, a surface on which the display 12 is provided) of the integrated device of which the lower portion is inserted into the groove 71a. By the second support portion 72, the cradle 5 can support the integrated device more stably. The shape of the housing illustrated in FIG. 7 is exemplary and in other embodiment, the housing of the cradle 5 may have any shape enabling mounting of the body device 2.

In addition, the cradle 5 includes a body terminal 73 to allow the cradle 5 to perform communication with the integrated device. As illustrated in FIG. 7, the body terminal 73 is provided on a bottom surface of the groove 71a formed in the first support portion 71. More specifically, the body terminal 73 is provided at a position which the lower terminal 27 of the body device 2 contacts, when the integrated device is mounted on the cradle 5. In this embodiment, the body terminal 73 is a USB connector (more specifically, a male-side connector).

Although not illustrated in FIG. 7, the cradle 5 has terminals (in this embodiment, the cradle 5 has a plurality of terminals. Specifically, the cradle 5 has a terminal 132 for a monitor, a power supply terminal 134, and terminals 137 for extension illustrated in FIG. 10) on a back surface of the housing. These terminals will be described in detail below.

Shapes, numbers, and arrangement positions of the components (specifically, the housings, the terminals, and the buttons) provided in the cradle 5, described above, are arbitrary. For example, in other embodiment, the housing may have other shape capable of supporting the integrated device in which the left controller 3 and the right controller 4 are mounted on the body device 2 or the single body of the body device 2. In addition, a part of the terminals provided in the housing may be provided on a front surface of the housing. In addition, in other embodiment, the cradle 5 may have a configuration in which a part of the components is not included.

[Internal Configuration of Body Device]

Figure 8:
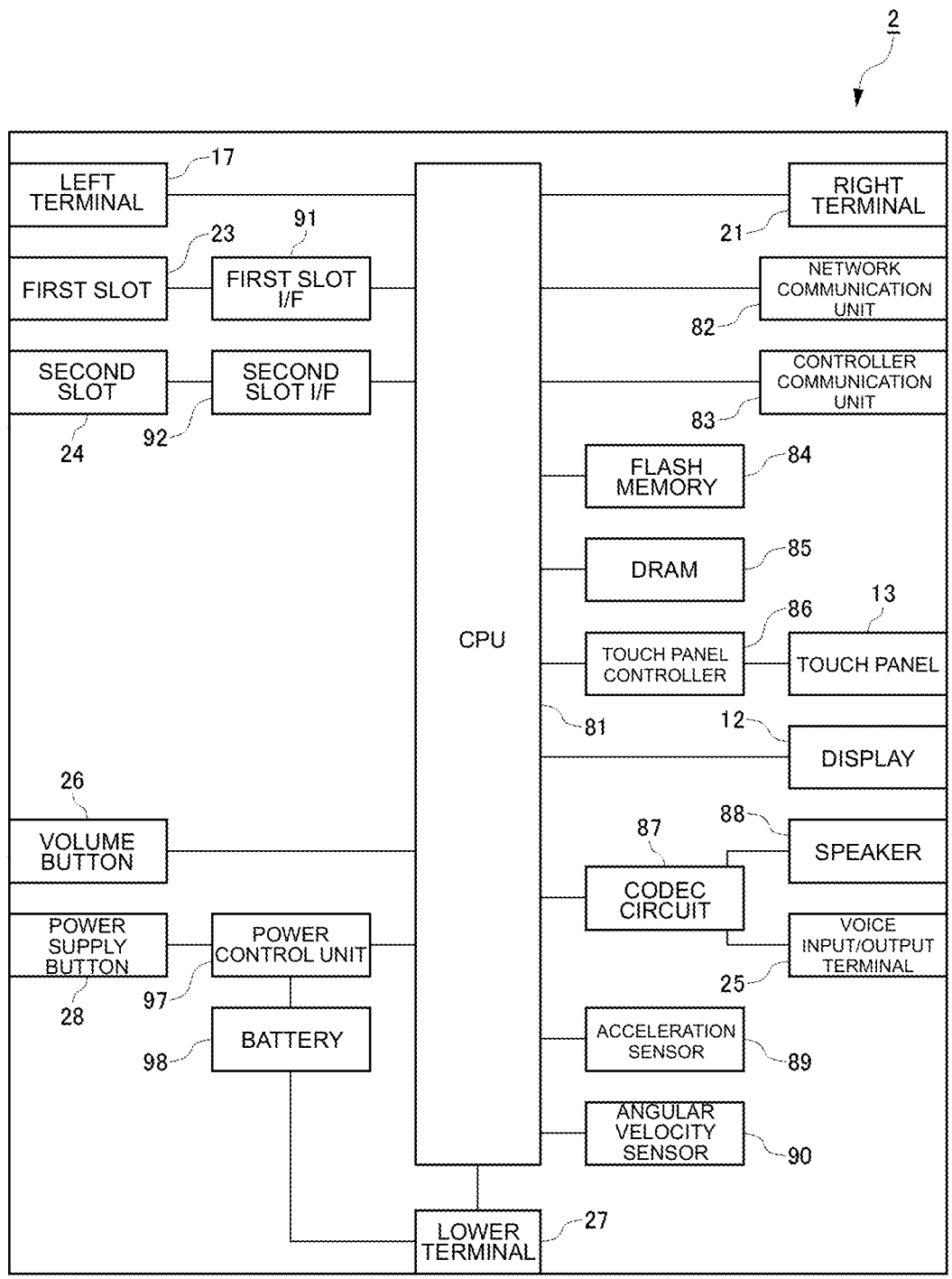
FIG. 8 is a block diagram illustrating an internal configuration of an example of the body device according to the embodiment.

FIG. 8 is a block diagram illustrating an example of an internal configuration of the body device 2. The body device 2 includes components 81 to 98 illustrated in FIG. 8, in addition to the configuration illustrated in FIG. 3. A part of the components 81 to 98 may be mounted as electronic components on an electronic circuit board and may be stored in the housing 11.

The body device 2 includes a central processing unit (CPU) 81. The CPU 81 is an information processing unit that executes various information processing executed in the body device 2. The CPU 81 executes an information processing program stored in a storage unit (specifically, internal storage media such as flash memory 84 or external storage media mounted on the individual slots 23 and 24) and executes the various information processing.

The body device 2 includes the flash memory 84 and dynamic random access memory (DRAM) 85 as an example of the internal storage media embedded in the body device 2. The flash memory 84 and the DRAM 85 are connected to the CPU 81. The flash memory 84 is a memory mainly used to store various data (may be programs) stored in the body device 2. The DRAM 85 is a memory used to temporarily store various data used in information processing.

The body device 2 includes a first slot interface (hereinafter, abbreviated to "I/F") 91. In addition, the body device 2 includes a second slot I/F 92. The first slot I/F 91 and the second slot I/F 92 are connected to the CPU 81. The first slot I/F 91 is connected to the first slot 23 and performs read/write of data for a first kind of storage medium (for example, an SD card) mounted on the first slot 23, according to a command from the CPU 81. The second slot I/F 92 is connected to the second slot 24 and performs read/write of data for a second kind of storage medium (for example, a dedicated memory card) mounted on the second slot 24, according to a command from the CPU 81.

The CPU 81 appropriately reads or writes data between the flash memory 84 and the DRAM 85 and the individual storage media and executes the information processing.

The body device 2 includes a network communication unit 82. The network communication unit 82 is connected to the CPU 81. The network communication unit 82 performs communication (specifically, wireless communication) with an external device via a network. In this embodiment, the network communication unit 82 is connected to a wireless LAN and performs communication with the external device, using a system based on a standard of Wi-Fi as a first communication aspect.

In addition, the network communication unit 82 performs wireless communication with the same kind of other body device 2, using a predetermined communication system (for example, communication based on an original protocol or infrared communication) as a second communication aspect. The wireless communication according to the second communication aspect realizes a function of enabling so-called "local communication" in which wireless communication with other body device 2 disposed in a closed local network area is enabled and data is transmitted and received by performing communication directly between a plurality of body devices 2.

The body device 2 includes a controller communication unit 83. The controller communication unit 83 is connected to the CPU 81. The controller communication unit 83 performs wireless communication with the left controller 3 and/or the right controller 4. A communication system between the body device 2 and the left controller 3 and the right controller 4 is arbitrary. However, in this embodiment, the controller communication unit 83 performs communication based on a standard of Bluetooth (registered trademark) with the left controller 3 and the right controller 4.

The CPU 81 is connected to the left terminal 17, the right terminal 21, and the lower terminal 27. When wired communication with the left controller 3 is performed, the CPU 81 transmits data to the left controller 3 via the left terminal 17 and receives operation data from the left controller 3 via the left terminal 17. In addition, when wired communication with the right controller 4 is performed, the CPU 81 transmits data to the right controller 4 via the right terminal 21 and receives operation data from the right controller 4 via the right terminal 21. A configuration to receive the operation data from the controller in the body device 2 corresponds to an operation data acquisition unit. In addition, when communication with the cradle 5 is performed, the CPU 81 transmits data to the cradle 5 via the lower terminal 27.

As such, in this embodiment, the body device 2 can perform both wired communication and wireless communication with the left controller 3 and the right controller 4. In addition, in the case where the integrated device in which the left controller 3 and the right controller 4 are mounted on the body device 2 is mounted on the cradle 5, the body device 2 can output data (for example, image data or voice data) to the stationary monitor 6 via the cradle 5.

Here, the body device 2 can perform communication at the same time as the plurality of left controllers 3 (in other words, in parallel to the plurality of left controllers 3). In addition, the body device 2 can perform communication at the same time as the plurality of right controllers 4 (in other words, in parallel to the plurality of right controllers 4). Therefore, the user can perform an input to the body device 2 using the plurality of left controllers 3 and the plurality of right controllers 4.

The body device 2 includes a touch panel controller 86 to be a circuit to control the touch panel 13. The touch panel controller 86 is connected between the touch panel 13 and the CPU 81. The touch panel controller 86 generates data showing a position where a touch input is performed, on the basis of a signal from the touch panel 13, and outputs the data to the CPU 81.

In addition, the display 12 is connected to the CPU 81. The CPU 81 displays an image generated (by execution of the information processing, for example) and/or an image acquired from the outside, on the display 12.

The body device 2 includes a codec circuit 87 and a speaker (specifically, a left speaker and a right speaker) 88. The codec circuit 87 is connected to the speaker 88 and the voice input/output terminal 25 and is connected to the CPU 81. The codec circuit 87 is a circuit to control an input/output of voice data with respect to the speaker 88 and the voice input/output terminal 25. That is, when the codec circuit 87 receives voice data from the CPU 81, the codec circuit 87 outputs a voice signal, obtained by performing D/A conversion on the voice data, to the speaker 88 or the voice input/output terminal 25.

As a result, sounds are output from a voice output unit (for example, an earphone) connected to the speaker 88 or the voice input/output terminal 25. In addition, when the codec circuit 87 receives a voice signal from the voice input/output terminal 25, the codec circuit 87 performs A/D conversion on the voice signal and outputs voice data of a predetermined format to the CPU 81. In addition, a volume button 26 is connected to the CPU 81. The CPU 81 controls volumes of sounds output from the speaker 88 or the voice output unit, on the basis of an input to the volume button 26.

The body device 2 includes an acceleration sensor 89. The acceleration sensor 89 detects acceleration (including gravitational acceleration) of the body device 2, that is, force (including gravity) applied to the body device 2. The acceleration sensor 89 detects a value of acceleration (linear acceleration) of a linear direction along a sensing axial direction, in acceleration applied to a detection unit of the acceleration sensor 89.

In this embodiment, the acceleration sensor 89 detects magnitudes of linear accelerations along predetermined triaxial (for example, xyz axes illustrated in FIG. 1) directions. As the acceleration sensor 89, a triaxial acceleration sensor may be used, a combination of a biaxial acceleration sensor and a uniaxial acceleration sensor may be used, and three uniaxial acceleration sensors may be used. For example, in the case of a multiaxial acceleration sensor having two axes or more, acceleration of a component along each axis is detected as the acceleration applied to the detection unit of the acceleration sensor. In addition, the acceleration sensor 89 may detect acceleration of a uniaxial direction or biaxial directions.

The body device 2 includes an angular velocity sensor 90. The angular velocity sensor 90 according to this embodiment detects angular velocities around three axes (in this embodiment, the xyz axes illustrated in FIG. 1) and outputs data (angular velocity data) showing the detected angular velocities to the CPU 81. The angular velocity sensor 90 may be configured using a triaxial gyro sensor and may be configured using a combination of gyro sensors having two axes or less.

Specifically, the angular velocity sensor 90 detects an angular velocity around the x axis (per unit time), an angular velocity around the y axis (per unit time), and an angular velocity around the z axis (per unit time). In the present specification, rotation directions around the xyz axes are called a roll direction, a pitch direction, and a yaw direction, respectively, on the basis of the z-axis positive direction of the body device 2. The acceleration sensor or the gyro sensor is generally called an inertial sensor.

The body device 2 includes a power control unit 97 and a battery 98. The power control unit 97 is connected to the battery 98 and the CPU 81. Although not illustrated in the drawings, the power control unit 97 is connected to the individual units (specifically, the individual units receiving power fed from the battery 98, the left terminal 17, and the right terminal 21) of the body device 2. The power control unit 97 controls supplying of power from the battery 98 to the individual units, on the basis of a command from the CPU 81. In addition, the power control unit 97 is connected to the power supply button 28.

The power control unit 97 controls supplying of power to the individual units, on the basis of an input to the power supply button 28. That is, when an operation to turn off the power supply is performed for the power supply button 28, the power control unit 97 stops supplying of power to all or a part of the individual units and when an operation to turn on the power supply is performed for the power supply button 28, the power control unit 97 starts supplying of power to all or a part of the individual units. In addition, the power control unit 97 outputs information (specifically, information showing whether the power supply button 28 is pressed) showing the input to the power supply button 28 to the CPU 81.

In addition, the battery 98 is connected to the lower terminal 27. When an external charging device (for example, the cradle 5) is connected to the lower terminal 27 and power is supplied to the body device 2 via the lower terminal 27, the battery 98 is charged with the supplied power.

[Internal Configurations of Left Controller and Right Controller]

Figure 9:
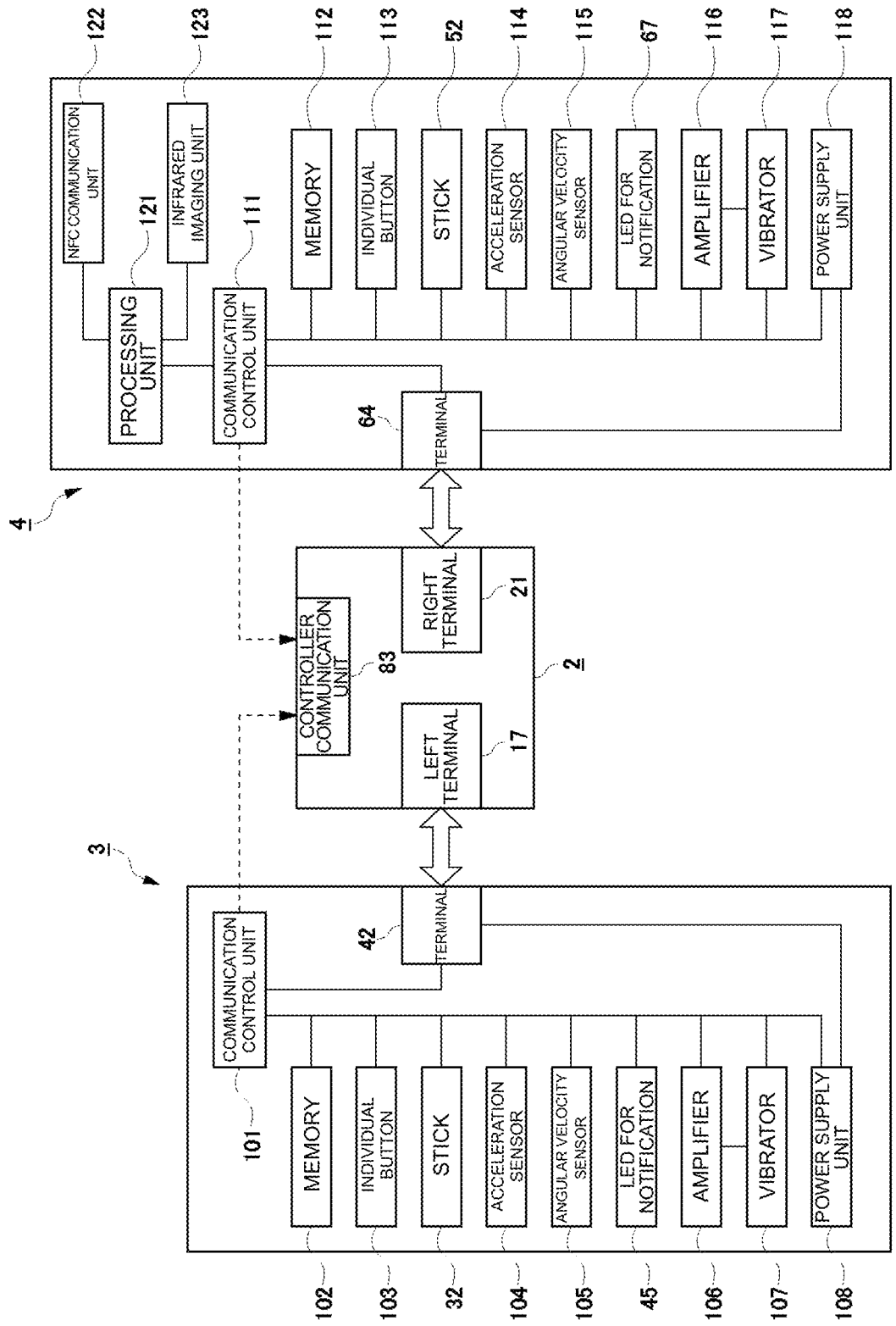
FIG. 9 is a block diagram illustrating an internal configuration of an example of the left controller and the right controller according to the embodiment.

FIG. 9 is a block diagram illustrating an example of internal configurations of the left controller 3 and the right controller 4. In FIG. 9, the body device 2 configuring the gaming system 1 with the left controller 3 and the right controller 4 is also illustrated. However, because the internal configuration of the body device 2 is illustrated in detail in FIG. 8, a partial configuration is omitted in FIG. 9.

The left controller 3 includes a communication control unit 101 to perform communication with the body device 2. The communication control unit 101 is connected to the individual components including the terminal 42. In this embodiment, the communication control unit 101 can perform communication with the body device 2, using both wired communication using the terminal 42 and wireless communication not using the terminal 42.

The communication control unit 101 controls a communication method executed by the left controller 3 with respect to the body device 2. That is, when the left controller 3 is mounted on the body device 2, the communication control unit 101 performs communication with the body device 2 via the terminal 42. In addition, when the left controller 3 is removed from the body device 2, the communication control unit 101 performs wireless communication with the body device 2 (specifically, the controller communication unit 83). The wireless communication between the controller communication unit 83 and the communication control unit 101 is performed according to the standard of Bluetooth (registered trademark), for example.

In addition, the left controller 3 includes a memory 102 such as flash memory. The communication control unit 101 is configured using a microcomputer (also called a microprocessor) and executes various processing by executing firmware stored in the memory 102.

The left controller 3 includes an individual button 103 (specifically, buttons 33 to 39, 43, and 44). In addition, the left controller 3 includes an analog stick (described as a "stick" in FIG. 9) 32. The individual button 103 and the analog stick 32 repetitively output information regarding operations performed for the individual button 103 and the analog stick 32 to the communication control unit 101 at appropriate timing.

The left controller 3 includes an acceleration sensor 104. The acceleration sensor 104 detects acceleration (including gravitational acceleration) of the left controller 3, that is, force (including gravity) applied to the left controller 3. The acceleration sensor 104 detects a value of acceleration (linear acceleration) of a linear direction along a sensing axial direction, in acceleration applied to a detection unit of the acceleration sensor 104.

In this embodiment, the acceleration sensor 104 detects magnitudes of linear accelerations along predetermined triaxial (for example, the xyz axes illustrated in FIG. 1) directions. As the acceleration sensor 104, a triaxial acceleration sensor may be used, a combination of a biaxial acceleration sensor and a uniaxial acceleration sensor may be used, and three uniaxial acceleration sensors may be used. For example, in the case of a multiaxial acceleration sensor having two axes or more, acceleration of a component along each axis is detected as the acceleration applied to the detection unit of the acceleration sensor. In addition, the acceleration sensor 104 may detect acceleration of a uniaxial direction or biaxial directions.

As described above, because the acceleration sensor 104 detects acceleration of the linear direction along each axis, an output from the acceleration sensor 104 represents a value of the linear acceleration of each of the three axes. That is, the detected acceleration is represented as a three-dimensional vector (ax, ay, az) in an xyz coordinate system (controller coordinate system) set on the basis of the left controller 3. Hereinafter, a vector using individual acceleration values for the three axes, detected by the acceleration sensor 104, as individual components is called an acceleration vector. Data (acceleration data) showing the acceleration (acceleration vector) detected by the acceleration sensor 104 is output to the communication control unit 101.

In addition, the left controller 3 includes an angular velocity sensor 105. The angular velocity sensor 105 according to this embodiment detects angular velocities around the three axes (in this embodiment, the xyz axes illustrated in FIG. 1) and outputs data (angular velocity data) showing the detected angular velocities to the communication control unit 101. The angular velocity sensor 105 may be configured using a triaxial gyro sensor and may be configured using a combination of gyro sensors having two axes or less.

Specifically, the angular velocity sensor 105 detects an angular velocity around the x axis (per unit time), an angular velocity around the y axis (per unit time), and an angular velocity around the z axis (per unit time). In the present specification, rotation directions around the xyz axes are called a roll direction, a pitch direction, and a yaw direction, respectively, on the basis of the z-axis positive direction of the left controller 3. The acceleration sensor 104 and the angular velocity sensor 105 correspond to the inertial sensor.

In this embodiment, for the purpose of facilitating computation in posture calculation processing to be described below, the three axes for which the angular velocity sensor 105 detects the angular velocities are set to be matched with the three axes (xyz axes) for which the acceleration sensor 104 detects the accelerations. However, in other embodiment, the three axes for which the angular velocity sensor 105 detects the angular velocities may not be matched with the three axes for which the acceleration sensor 104 detects the accelerations.

Each of the acceleration sensor 104 and the angular velocity sensor 105 is connected to the communication control unit 101. Each of data (acceleration data) showing the acceleration of each axis detected by the acceleration sensor 104 and data (angular velocity data) showing the angular velocity of each axis detected by the angular velocity sensor 105 is output to the communication control unit 101. Therefore, the acceleration data of each axis and the angular velocity data of each axis are input to the communication control unit 101.

The communication control unit 101 acquires information regarding an operation for each operation member from each operation member (specifically, the individual button 103 and the analog stick 32) and acquires information regarding a movement of the left controller 3 from the inertial sensor (specifically, the acceleration sensor 104 and the angular velocity sensor 105). The communication control unit 101 transmits operation data including the acquired information (or information obtained by executing predetermined processing on the acquired information) to the body device 2. That is, the acceleration data and the angular velocity data are included in the operation data transmitted from the communication control unit 101 to the body device 2.

The operation data is repetitively transmitted at a ratio of one time per predetermined time. An interval when the operation data is transmitted to the body device 2 may be equally applied to each operation member and each inertial sensor and may not be equally applied. However, because gaming processing is generally performed with 1/60 seconds as a unit (one frame time), the operation data is preferably transmitted at a cycle equal to or shorter than the time.

The operation data is transmitted to the body device 2, so that the body device 2 can obtain an input (an operation for the operation member and an operation by moving the left controller 3) performed for the left controller 3. That is, the body device 2 can determine operations for the individual button 103 and the analog stick 32, on the basis of the operation data. In addition, the body device 2 can calculate information regarding the movement and/or the posture of the left controller 3, on the basis of the acceleration data and the angular velocity data.

The left controller 3 includes an LED 45 for a notification. The LED 45 for the notification includes four LED lamps, as illustrated in FIG. 4. The LED 45 for the notification is controlled by the communication control unit 101 and mainly represents a status of the left controller 3 by a combination of turning on and turning off of the four LED lamps.

The left controller 3 includes a vibrator 107 to notify the user by a vibration. In this embodiment, the vibrator 107 is controlled by a command from the body device 2. That is, if the communication control unit 101 receives the command from the body device 2, the communication control unit 101 drives the vibrator 107 according to the command. Here, the left controller 3 includes an amplifier 106. If the communication control unit 101 receives the command, the communication control unit 101 outputs a control signal according to the command to the amplifier 106. The amplifier 106 amplifies the control signal from the communication control unit 101, generates a drive signal to drive the vibrator 107, and gives the drive signal to the vibrator 107. As a result, the vibrator 107 operates.

The left controller 3 includes a power supply unit 108. In this embodiment, the power supply unit 108 has a battery and a power control circuit. Although not illustrated in the drawings, the power control circuit is connected to the battery and is connected to each unit (specifically, each unit receiving power fed from the battery) of the left controller 3. The power control circuit controls supplying of power from the battery to each unit. In addition, the battery is connected to the terminal 42. In this embodiment, when the left controller 3 is mounted on the body device 2, the battery is charged with the power fed from the body device 2 via the terminal 42, under a predetermined condition.

As illustrated in FIG. 9, the right controller 4 includes a communication control unit 111 to perform communication with the body device 2. In addition, the right controller 4 includes a memory 112 that is connected to the communication control unit 111. The communication control unit 111 is connected to individual components including the terminal 64. The communication control unit 111 and the memory 112 have the same functions as the communication control unit 101 and the memory 102 of the left controller 3. Therefore, the communication control unit 111 can perform communication with the body device 2, using both wired communication using the terminal 64 and wireless communication (specifically, communication based on a standard of Bluetooth (registered trademark)) not using the terminal 64, and controls a communication method executed by the right controller 4 with respect to the body device 2.

The right controller 4 includes each operation member (specifically, an individual button 113 and an analog stick 52) equal to each operation member of the left controller 3 and each inertial sensor (specifically, an acceleration sensor 114 and an angular velocity sensor 115) equal to each inertial sensor of the left controller 3. Each operation member and each inertial sensor have the same function as each input unit of the left controller 3 and operate in the same way.

In addition, the right controller 4 includes a vibrator 117 and an amplifier 116. The vibrator 117 and the amplifier 116 operate in the same way as the vibrator 107 and the amplifier 106 of the left controller 3. That is, the communication control unit 111 operates the vibrator 117 using the amplifier 116, according to a command from the body device 2.

The right controller 4 includes a power supply unit 118. The power supply unit 118 has the same function as the power supply unit 108 of the left controller 3 and operates in the same way. That is, the power supply unit 118 controls supplying of power to each unit receiving power fed from the battery. In addition, when the right controller 4 is mounted on the body device 2, the battery is charged with the power fed from the body device 2 via the terminal 64, under a predetermined condition.

The right controller 4 includes a processing unit 121. The processing unit 121 is connected to the communication control unit 111 and is connected to an NFC communication unit 122. The processing unit 121 executes management processing for the NFC communication unit 122, according to a command from the body device 2. For example, the processing unit 121 controls an operation of the NFC communication unit 122, according to a command from the body device 2. In addition, the processing unit 121 controls a start of the NFC communication unit 122 or controls an operation (specifically, read and write) of the NFC communication unit 122 with respect to a communication partner (for example, an NFC tag).

In addition, the processing unit 121 receives information to be transmitted to the communication partner via the communication control unit 111 from the body device 2 and delivers the information to the NFC communication unit 122 or acquires the information received from the communication partner from the NFC communication unit 122 and transmits the information to the body device 2 via the communication control unit 111. In addition, the processing unit 121 executes management processing for an infrared imaging unit 123, according to a command from the body device 2. For example, the processing unit 121 causes the infrared imaging unit 123 to execute an imaging operation or acquires information (information of an imaging image or information calculated from the information) based on an imaging result and transmits the information to the body device 2 via the communication control unit 111.

[Internal Configuration of Cradle]

Figure 10:
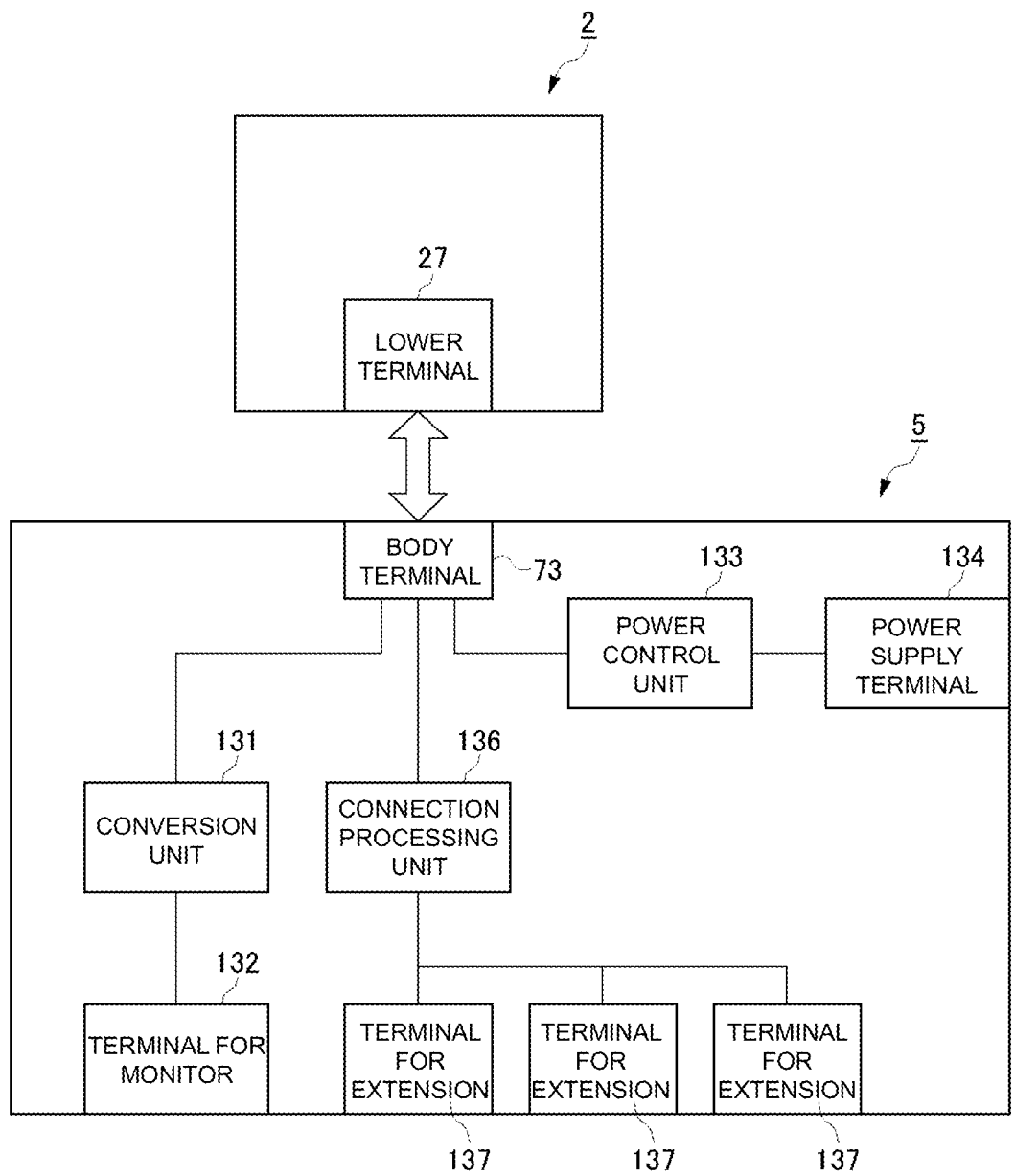
FIG. 10 is a block diagram illustrating an internal configuration of an example of the cradle according to the embodiment.

FIG. 10 is a block diagram illustrating an example of an internal configuration of the cradle 5. Because the internal configuration of the body device 2 is illustrated in detail in FIG. 8, the internal configuration of the body device 2 is omitted in FIG. 10. As illustrated in FIG. 10, the cradle 5 includes a conversion unit 131 and a terminal 132 for a monitor. The conversion unit 131 is connected to the body terminal 73 and the terminal 132 for the monitor. The conversion unit 131 converts a format of a signal regarding an image (also called video) received from the body device 2 and a signal regarding a voice into a format of a signal output to the stationary monitor 6.

In this embodiment, the body device 2 outputs signals of an image and a voice as display port signals (that is, signals according to a standard of DisplayPort) to the cradle 5. In addition, in this embodiment, communication based on a standard of HDMI (registered trademark) is used as communication between the cradle 5 and the stationary monitor 6. That is, the terminal 132 for the monitor is an HDMI terminal and the cradle 5 and the stationary monitor 6 are connected by an HDMI cable. In addition, the conversion unit 131 converts display port signals (specifically, signals showing video and a voice) received from the body device 2 via the body terminal 73 into HDMI signals. The converted HDMI signals are output to the stationary monitor 6 via the terminal 132 for the monitor.

The cradle 5 includes a power control unit 133 and a power supply terminal 134. The power supply terminal 134 is a terminal to connect a charging device (for example, an AC adapter) not illustrated in the drawings. In this embodiment, the AC adapter is connected to the power supply terminal 134 and commercial power is supplied to the cradle 5. When the body device 2 is mounted on the cradle 5, the power control unit 133 supplies power from the power supply terminal 134 to the body device 2 via the body terminal 73. As a result, the battery 98 of the body device 2 is charged.

In addition, the cradle 5 includes a connection processing unit 136 and terminals 137 for extension. The terminals 137 for extension are terminals to connect other devices. In this embodiment, the cradle 5 includes a plurality of (more specifically, three) USB terminals as the terminals 137 for the extension. The connection processing unit 136 is connected to the body terminal 73 and each terminal 137 for the extension. The connection processing unit 136 has a function as a USB hub and manages communication between devices connected to the terminals 137 for the extension and the body device 2 connected to the body terminal 73 (that is, a signal from a certain device is appropriately distributed to other device and is transmitted). As such, in this embodiment, the gaming system 1 can perform communication with other device via the cradle 5. The connection processing unit 136 can convert a communication speed or can perform supplying of power to the devices connected to the terminals 137 for the extension.

[Use Aspects]

As described above, in the gaming system 1 according to this embodiment, the left controller 3 and the right controller 4 can be removed from the body device 2. In addition, the integrated device in which the left controller 3 and the right controller 4 are mounted on the body device 2 or the single body of the body device 2 is mounted on the cradle 5, so that an image (and a voice) can be output to the stationary monitor 6. Therefore, the gaming system 1 can be used in various use aspects to be described below.

Figure 11:
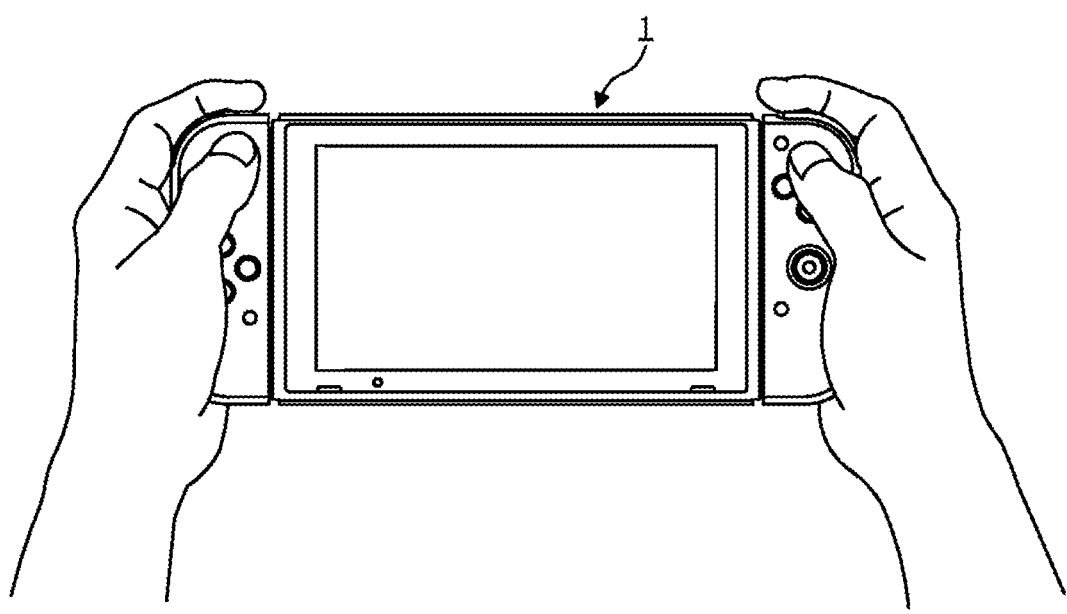
FIG. 11 is a diagram illustrating an example of a use aspect of the gaming system according to the embodiment.

FIG. 11 is a diagram illustrating an example of an aspect where the left controller 3 and the right controller 4 are mounted on the body device 2 and the gaming system 1 is used as the integrated device. As illustrated in FIG. 11, the user grips the left controller 3 by the left hand and grips the right controller 4 by the right hand. In this case, the body device 2 is located between the left hand and the right hand and the user can view the display 12 from the front. At this time, typically, the user operates the analog stick 32 of the left controller 3 by the thumb of the left hand and operates the four operation buttons 53 to 56 of the right controller 4 by the thumb of the right hand.

In this use aspect, an operation for the analog stick 32 of the left controller 3 is transmitted as operation data to the body device 2 via the terminal 42 and the left terminal 17 and an operation for the operation buttons 53 to 56 of the right controller 4 is transmitted as operation data to the body device via the terminal 64 and the right terminal 21.

In addition, in this use aspect, acceleration and an angular velocity of the integrated device in which the body device 2, the left controller 3, and the right controller 4 are integrated can be calculated and can be input as operation data to the CPU 81. In this case, as described above, because each of the body device 2, the left controller 3, and the right controller 4 includes the acceleration sensor and the angular velocity sensor, the acceleration detected by the acceleration sensor 89 of the body device 2 and the angular velocity detected by the angular velocity sensor 90 may be used as the acceleration and the angular velocity of the integrated device. In other embodiment, using the acceleration sensor 104 and the angular velocity sensor 105 of the left controller 3 and/or the acceleration sensor 114 and the angular velocity sensor 115 of the right controller 4, instead of the acceleration sensor 89 and the angular velocity sensor 90 or in addition to the acceleration sensor 89 and the angular velocity sensor 90, the acceleration or the posture of the integrated device may be calculated on the basis of detection values thereof. As such, when the left controller 3 and the right controller 4 are mounted on the body device 2 and are used, the gaming system 1 can be used as a portable gaming device.

As described above, in this embodiment, the gaming system 1 can be used in a state (called a "separation state") in which the left controller 3 and the right controller 4 are removed from the body device 2. As an aspect of the case in which the gaming system 1 is used in the separation state and an operation for an application (for example, a game application) is performed, an aspect where one user uses one of the left controller 3 and the right controller 4 or both the left controller 3 and the right controller 4 is considered. In addition, an aspect where two users use the controllers one by one is considered.

Figure 12:
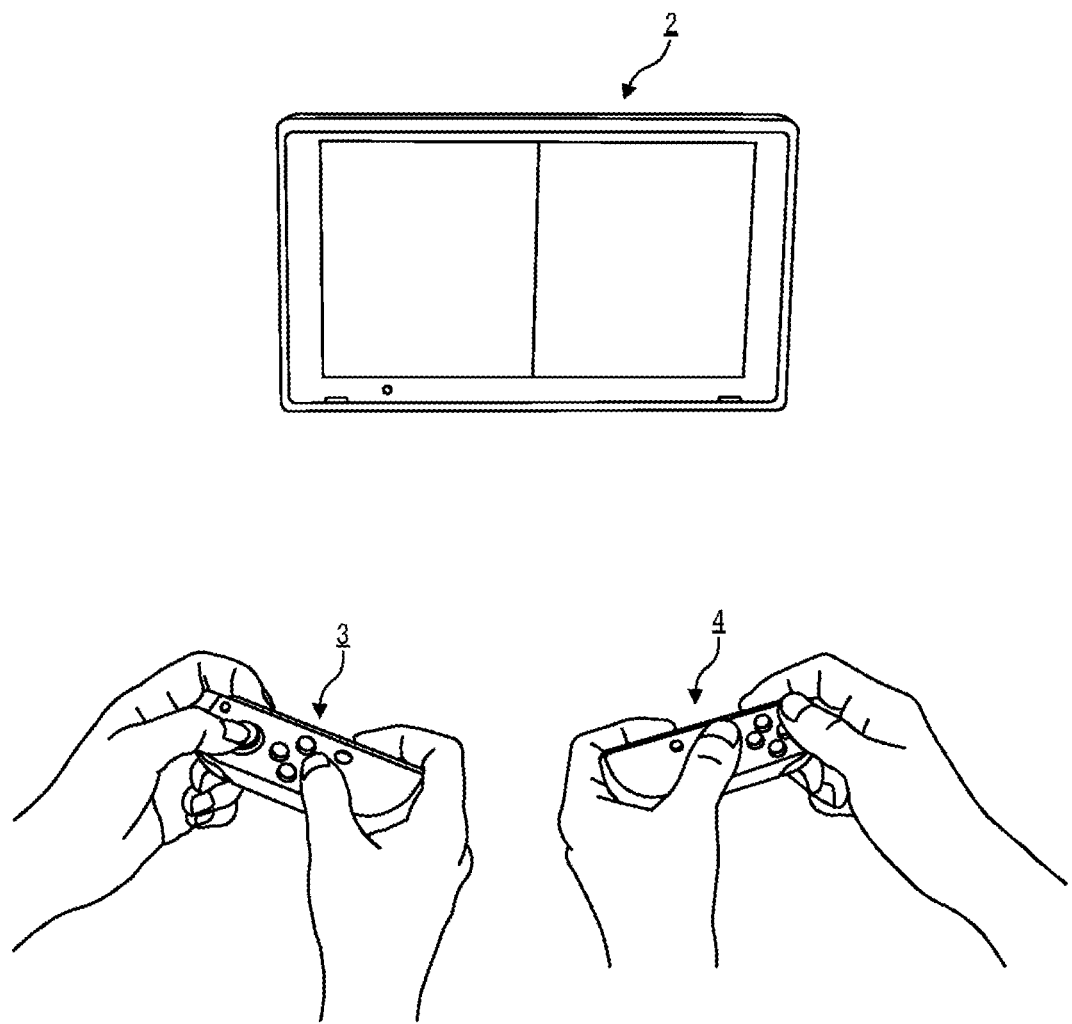
FIG. 12 is a diagram illustrating another example of the use aspect of the gaming system according to the embodiment.

FIG. 12 is a diagram illustrating an example of an aspect where the two users grip the controllers one by one and use the gaming system 1, in the separation state. As illustrated in FIG. 12, the two users can perform an operation in the separation state. Specifically, one user can perform an operation using the left controller 3 and the other user can perform an operation using the right controller 4. The gaming system 1 executes information processing for controlling an operation of a first object (for example, a player character) in a virtual space, on the basis of the operation for the left controller 3, and controlling an operation of a second object in the same virtual space, on the basis of the operation for the right controller 4.

Each user can view an image displayed on the display 12 of the body device 2 while gripping one of the left controller 3 and the right controller 4 by the left and right hands or the single hand and performing the operation. Similar to the aspect illustrated in FIG. 11, in the aspect illustrated in FIG. 12, each of the first user and the second user can execute the operation for the operation member included in the controller and/or the operation for moving the controller. Operation data showing the operations is transmitted from each of the left controller 3 and the right controller 4 to the body device 2 using the wireless communication.

Particularly, acceleration data and angular velocity data showing the acceleration and the angularity velocity detected by the acceleration sensor 104 and the angular velocity sensor 105 of the left controller 3 are transmitted to the body device 2 using the wireless communication and acceleration data and angular velocity data showing the acceleration and the angularity velocity detected by the acceleration sensor 114 and the angular velocity sensor 115 of the right controller 4 are transmitted to the body device 2 using the wireless communication. Because the left controller 3 and the right controller 4 are separated from the body device 2, the accelerations and the angular velocities are given dependently from each other. For this reason, the acceleration data and the angular velocity data of each of the left controller 3 and the right controller 4 are individually transmitted to the body device 2.

Figure 13:
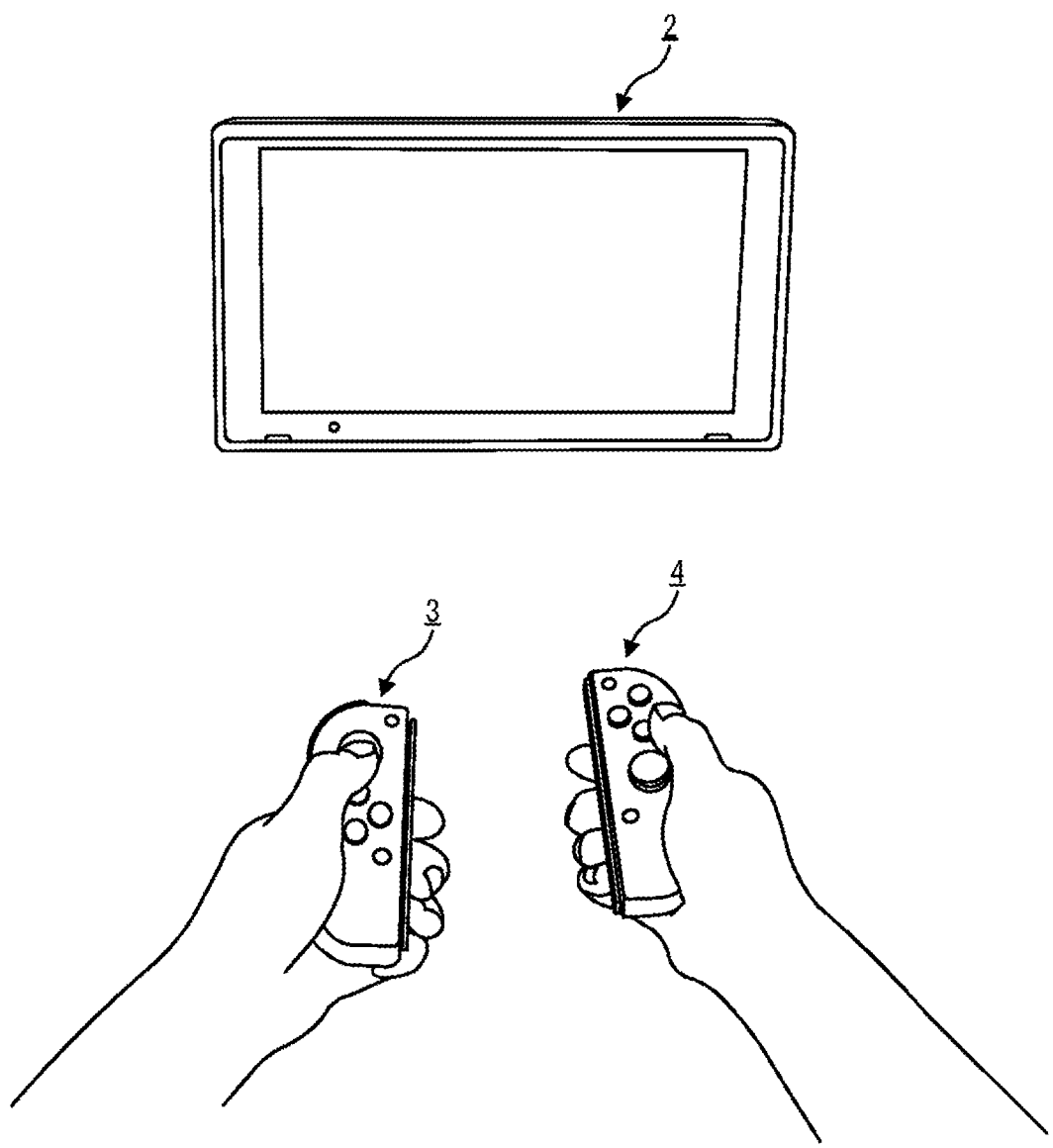
FIG. 13 is a diagram illustrating another example of the use aspect of the gaming system according to the embodiment.

FIG. 13 is a diagram illustrating an example of an aspect where one user grips the two controllers and uses the gaming system 1, in the separation state. As illustrated in FIG. 13, when one user uses the two controllers in the separation state, typically, one user grips the left controller 3 by the left hand and grips the right controller 4 by the right hand. Similar to the use aspect illustrated in FIG. 11, in this use aspect, the user can operate the analog stick 32 of the left controller 3 by the left hand and can operate the operation buttons 53 to 56 of the right controller 4 by the right hand.

In this use aspect, the left controller 3 and the right controller 4 can be moved independently from each other. For this reason, similar to the use aspect illustrated in FIG. 12, the acceleration data and the angular velocity data of each of the left controller 3 and the right controller 4 are individually transmitted to the body device 2. As such, when the left controller 3 and the right controller 4 are separated and the display 12 of the body device 2 is used, the gaming system 1 can provide a gaming device that has a portable configuration and enables a game in which the controller is moved (without moving the display) or a game in which the user performs an operation in a place separated from the display 12.

Figure 14:
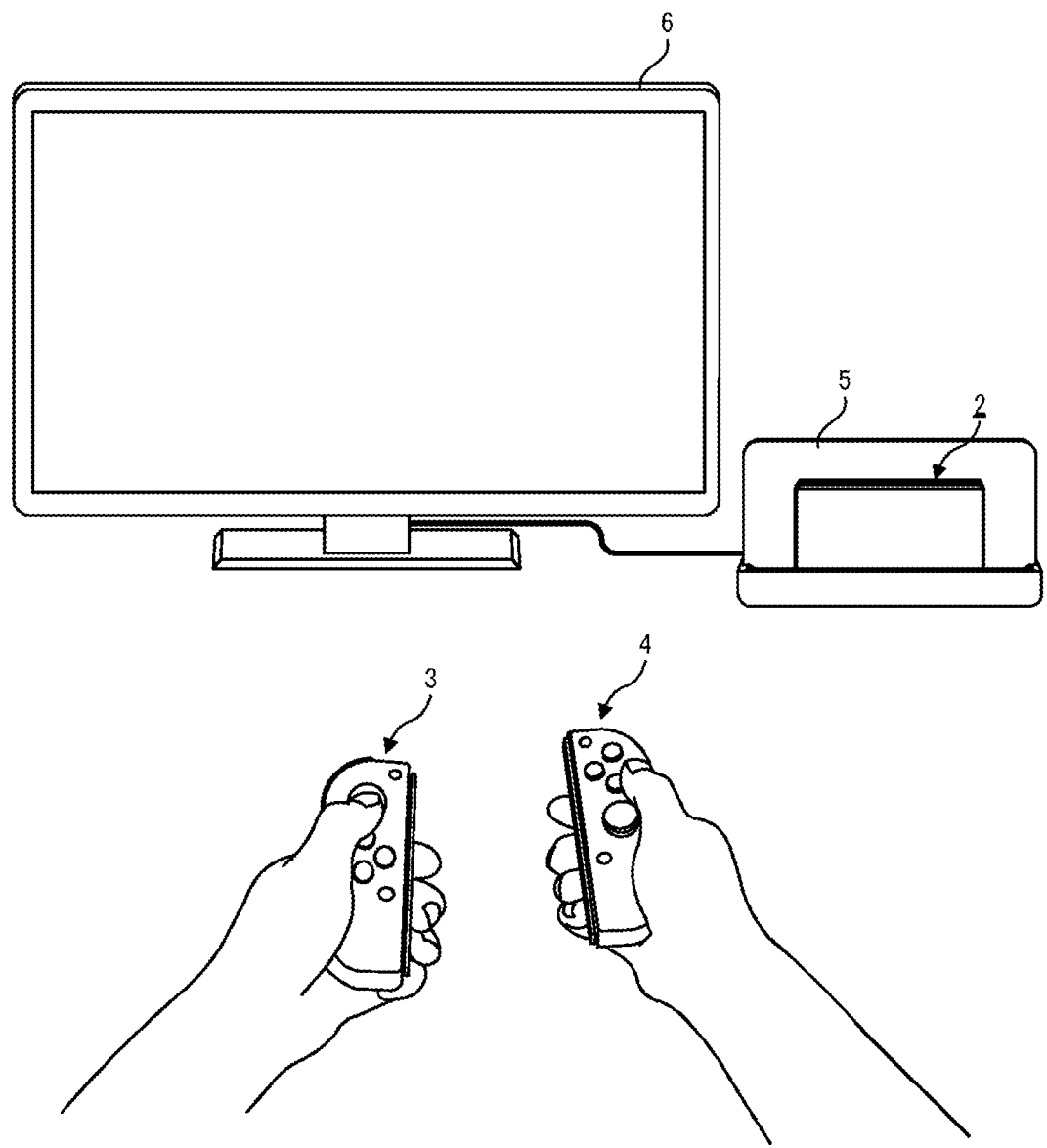
FIG. 14 is a diagram illustrating another example of the use aspect of the gaming system according to the embodiment.

FIG. 14 is a diagram illustrating another example of the aspect where one user grips the two controllers and uses the gaming system 1, in the separation state. As illustrated in FIG. 14, in the separation state, the body device 2 can be mounted on the cradle 5, the cradle 5 can be connected to the stationary monitor 6, and the user can play a game while viewing a screen of the stationary monitor 6. When an external display device is used as described above, the gaming system 1 can be used in the same way as the stationary gaming device according to the related art.

A position relation of the analog stick 52 and the individual operation buttons 53 to 56 in the right controller 4 is opposite to a position relation of the two kinds of operation units in the left controller 3, when the components are disposed vertically long as in FIG. 2. Therefore, as illustrated in FIG. 12, when the two users grip the left controller 3 and the right controller 4 in a direction where the left controller 3 and the right controller 4 are horizontally long, the position relation of the two kinds of operation units are the same in the two controllers. That is, in this embodiment, the users can use the left controller 3 and the right controller 4 removed from the body device 2 by the same operation sense, with respect to the two kinds of operation units. As a result, operability of the controllers can be improved.

In addition, as illustrated in FIGS. 13 and 14, when one user grips the left controller 3 by the left hand and grips the right controller 4 by the right hand, the operation buttons 53 to 56 are disposed at a position of the right controller 4 corresponding to an arrangement position of the analog stick 32 of the left controller 3. The position is a position where an operation by the thumb is easy, when the left controller 3 is gripped by the left hand and the right controller 4 is gripped by the right hand, and the user can operate the analog stick 32 of the left controller 3 by the left hand and can operate the operation buttons 53 to 56 of the right controller 4 by the right hand.

In addition, communication between the body device 2 and the left controller 3 and the right controller 4 in the separation state is performed by wireless communication. That is, the body device 2 receives operation data from the left controller 3 and/or the right controller 4 in which wireless communication with the body device 2 has been established (pairing has been performed) and executes information processing on the basis of the received operation data (specifically, using the operation data as an input).

In this embodiment, the body device 2 can perform communication with the plurality of left controllers 3. In addition, the body device 2 can perform communication with the plurality of right controllers 4. Therefore, three or more controllers can be used at the same time.

[Information Processing]

Next, an example of the information processing according to the embodiment will be described. In the gaming system 1 according to this embodiment, information processing including gaming processing is executed according to a program stored in the body device 2, on the basis of the operations (including the operations for moving the controllers) of the user input to the controllers (the left controller 3 and the right controller 4), and a result of the information processing is generated as image data and voice data using various data stored in the body device 2 and is output from the display 12 or the speaker 88.

Hereinafter, information processing when the controllers are used in the separation state will be described. If the controllers are moved by the user, the acceleration data and the angularity velocity data are generated in the controllers. The acceleration data and the angular velocity data generated by the controllers are transmitted as the operation data to the body device 2. In the body device 2, the information processing (gaming processing) according to the program is executed on the basis of the acceleration data and the angular velocity data of the controllers and a result thereof is output.

In this embodiment, particularly, as illustrated in FIG. 13 or 14, information processing when the left controller 3 and the right controller 4 are gripped by the left and right hands of one user and are used will be described. As illustrated in FIG. 12, this is applicable to the case in which one of two users uses the left controller 3 and the other uses the right controller 4 and is applicable to the case in which each of three or more users uses the left controller 3 or the right controller 4.

In this embodiment, information regarding the movement and/or the posture of the controller can be calculated on the basis of detection results of the acceleration sensor and/or the angular velocity sensor included in the controller. Therefore, the gaming system 1 can receive an operation for moving the controller as an input. The user can perform the operation for moving the controller as well as the operation for the operation member included in the controller.

In this embodiment, the body device 2 receives the acceleration data and the angular velocity data from each of the left controller 3 and the right controller 4 and determines that the user has performed a swing input operation for the left controller 3 and the right controller 4, on the basis of the data. In this embodiment, the swing input operation includes one-hand swing (or single swing) in which only one of the left controller 3 and the right controller 4 is swung and simultaneous swing in which both the left controller 3 and the right controller 4 are swung and the body device 2 determines whether the swing input operation is the one-hand swing or the simultaneous swing.

In addition, the body device 2 determines a direction (swing direction) of a swing input operation, for each of the left controller 3 and the right controller 4. As described above, the acceleration sensors 104 and 114 to detect the magnitudes of the linear accelerations along the triaxial directions and the angular velocity sensors 105 and 115 to detect the magnitudes of the angular velocities around the three axes are included in the left controller 3 and the right controller 4, respectively. Therefore, the body device 2 can determine a swing input operation of any direction.

The body device 2 can acquire the accelerations of the triaxial directions and the angular velocities around the three axes with respect to the coordinate system set to each sensor, from the left controller 3 and the right controller 4. When the posture of the controller is not considered, only a direction viewed from the sensor, that is, a direction viewed from the controller can be determined as a swing direction. For this reason, strictly speaking, the corresponding determination is not determination of the swing direction viewed from the user. For example, in the case in which the posture of the controller when the user grips the controller is inclined, even though the user swings the controller in a transverse direction, the body device 2 may determine that the user has swung the controller in a longitudinal direction.

To determine all swing input operations as swing inputs of a direction based on the user in the body device 2, it is necessary to determine the swing direction in consideration of the postures of the left controller 3 and the right controller 4 in the body device 2. Therefore, first, processing for determining the swing direction in consideration of the postures in the body device 2 will be described.

(Swing Direction Determination)

The CPU 81 executing swing direction determination processing is hereinafter called a swing direction determination unit 81. In addition, processing for determining the swing direction in consideration of the posture is hereinafter described using the left controller 3 as an example. However, the same swing direction determination can be performed for the right controller 4.

The swing direction determination unit 81 first calculates the posture of the left controller 3. The posture of the left controller 3 can be represented as a rotation from a reference posture. The left controller 3 includes the angular velocity sensor 105 that detects the angular velocities around the three axes. Because the angular velocity sensor 105 detects an angle (posture) change, in principle, the angular velocity sensor 105 can acquire a current posture of the left controller 3 by integrating (accumulating) angular velocity data (the posture change) from a point of time when the left controller 3 is at a known posture to a current point of time. However, it is known that an error due to a drift is included in an output from the gyro sensor. If data including the error is integrated, the error is small in short time, but the error is accumulated with time and the error of the posture increases.

Meanwhile, the left controller 3 includes the acceleration sensor 104 that detects the accelerations of the triaxial directions. The acceleration sensor 104 detects the accelerations including the gravitational acceleration. For this reason, when the left controller 3 remains stationary, the acceleration detected by the acceleration sensor 104 becomes only the gravitational acceleration and a direction of the acceleration at that time shows a gravitational direction viewed from the acceleration sensor 104. Therefore, a difference of a downward direction in a reference state set in the coordinate system of the acceleration sensor 104 and the acceleration direction at that time represents an inclination with respect to the gravitational direction in the left controller 3 that remains stationary. Accordingly, the posture of the left controller 3 can be acquired from acceleration data when the left controller 3 remains stationary, with respect to components other than a rotation with the gravitational direction as an axis. However, in cases other than the case in which the left controller 3 remains stationary or the case in which the left controller 3 is in a state of a uniform linear motion, components other than the gravitational acceleration are included in the acceleration data. For this reason, the accurate posture cannot be calculated.

Therefore, in this embodiment, for every one processing (typically, in processing of one flame), processing for acquiring the posture change from the known posture by adding a rotation by the angular velocity shown by the angular velocity data, acquiring the current posture, and correcting the acquired posture on the basis of the acceleration is executed. Specifically, correction processing for approximating the posture calculated on the basis of the angular velocity data to the posture calculated on the basis of the acceleration at a predetermined ratio is executed. The correction processing is executed each time, so that the downward direction of the left controller 3 in the reference state can be approximated to an actual gravitational direction in the long run. Meanwhile, in a period in which the left controller 3 moves, reliability of the posture calculated by the acceleration is low, but an influence of the correction processing by one processing is small. If the previous posture is correct, an error of the posture updated in a short period by the angular velocity is small. For this reason, the entire posture error does not increase in short time. Therefore, the posture can be continuously calculated while the error is maintained small at all times. When the magnitude of the acceleration is approximated to the magnitude of the gravitational acceleration, the left controller 3 is more likely to remain stationary. For this reason, when the magnitude of the acceleration is approximated to the magnitude of 1G, the ratio where the posture is approximated by the correction processing may be increased. By executing the above processing, the posture of the left controller 3 can be calculated with a small error.

If the posture of the left controller 3 is calculated, the swing direction determination unit 81 converts the angular velocity around the three axes, shown by the angular velocity data obtained from the angular velocity sensor 105, into an angular velocity in the coordinate system based on the gravitational direction, and calculates a converted angular velocity. That is, the angular velocity around the three axes, shown by the angular velocity data, is the angular velocity viewed from the left controller 3. Meanwhile, because the posture in the coordinate system based on the gravitational direction of the left controller 3 can be calculated as described above, the angular velocity in the coordinate system based on the gravitational direction can be calculated. When the swing input is determined, the angular velocity is added to the left controller 3 and the swing direction determination unit 81 can determine a swing direction using the converted angular velocity. That is, it can be determined whether the swing direction is a horizontal direction or a vertical direction when viewed from the user. In other words, this means that the swing direction determination unit 81 determines the swing direction on the basis of an angular change from a gravitational direction acquired at a certain point of time, on the basis of the gravitational direction.

(Swing Input Determination)

Next, processing for determining performance of a swing input for the controller by the CPU 81 will be described. The CPU 81 performing the determination (swing input determination) on that the swing input has been performed is hereinafter called a swing input determination unit 81. Hereinafter, processing of the swing input determination is described using the left controller 3 as an example. However, the same swing input determination can be performed for the right controller 4.

Figure 15:
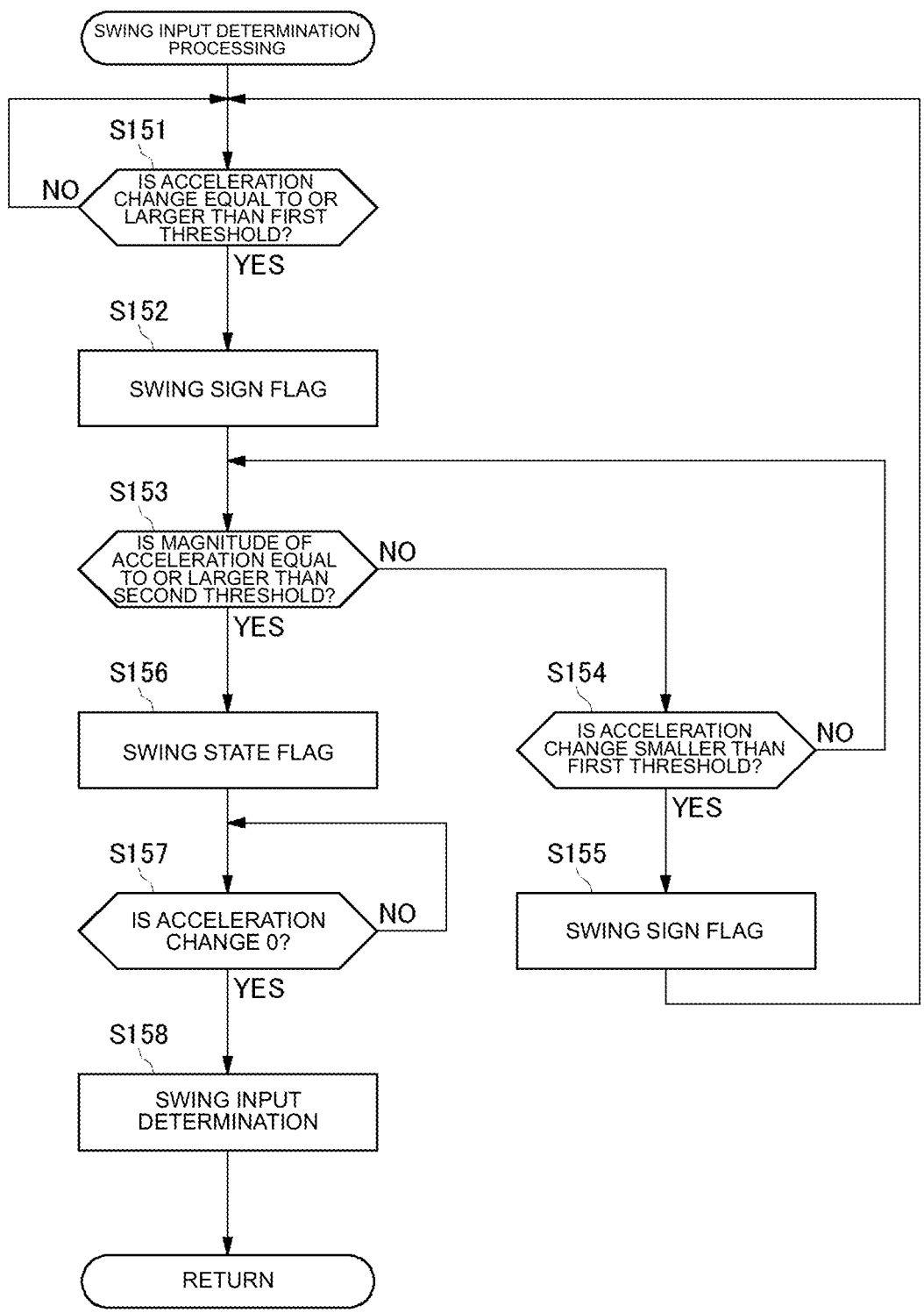
FIG. 15 is a flowchart illustrating an example of swing input determination processing according to the embodiment.
Figure 16:
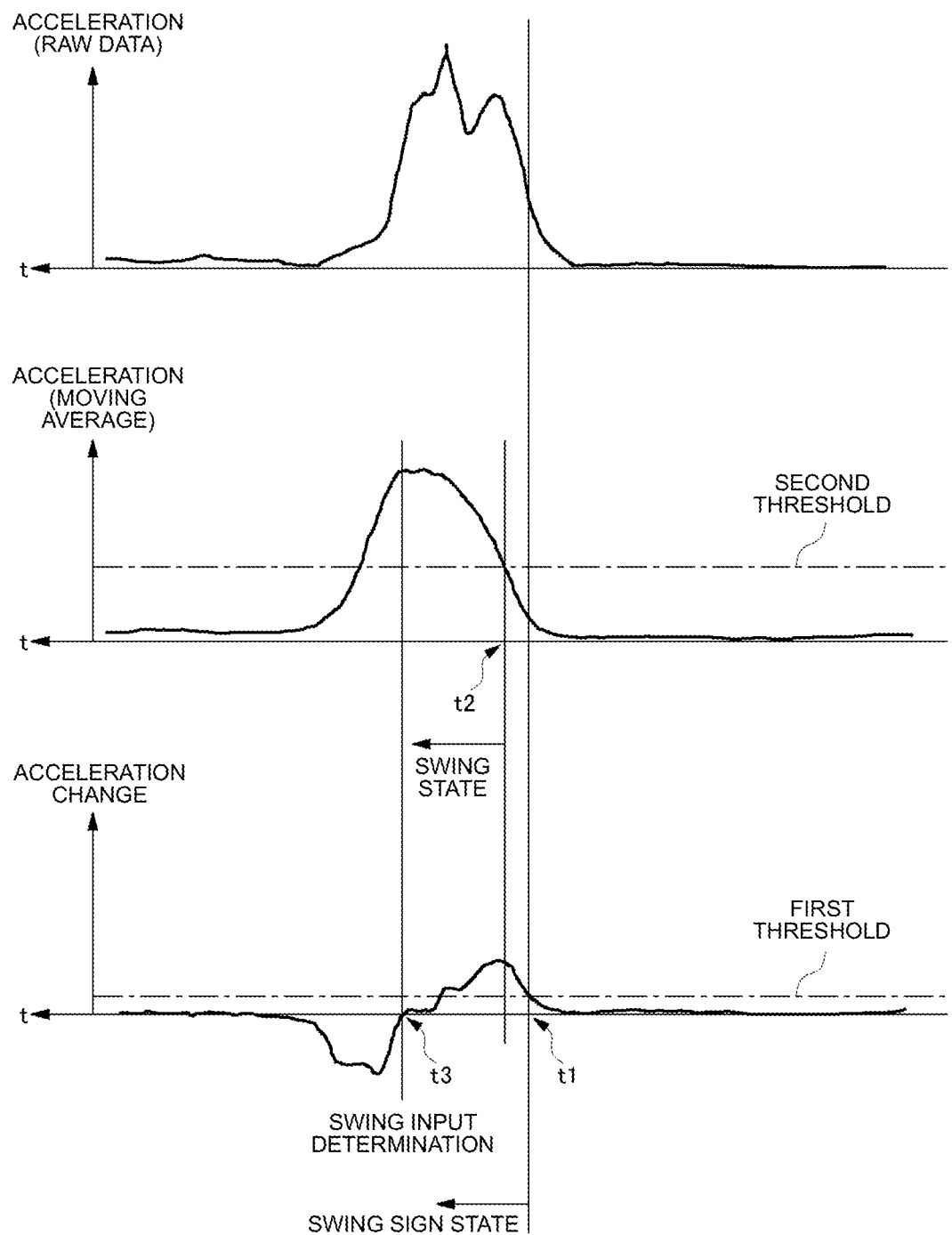
FIG. 16 shows graphs illustrating an example of acceleration data (raw data), acceleration data (moving average), and an acceleration change according to the embodiment.

The swing input determination unit 81 determines that the swing input has been performed for the left controller 3, on the basis of the acceleration data obtained by the acceleration sensor 104 of the left controller 3. FIG. 15 is a flowchart illustrating the swing input determination processing by the swing input determination unit 81. FIG. 16 shows graphs illustrating an example of acceleration (raw data) of the left controller 3, a moving average of the acceleration thereof, and a change of the acceleration thereof. In FIG. 16, a right side of each graph shows a past value and a left side of the graph shows a current value.

The swing input determination unit 81 computes a moving average of the magnitude of the acceleration by taking current and past averages of predetermined frame numbers, with respect to the magnitude (raw data) of the acceleration shown by the acceleration data obtained from the left controller 3. The moving average is calculated for each frame, a rapid change in the acceleration (raw data) shown by the upper graph of FIG. 16 is alleviated, and acceleration (moving average) to be smoothly changed is obtained as shown by the middle graph of FIG. 16.

In addition, the swing input determination unit 81 calculates a change of the acceleration (moving average) (hereinafter, referred to as the "acceleration change") for each frame. An acceleration change shown by the lower graph of FIG. 16 may be calculated by differentiating the acceleration (moving average) shown by the middle graph of FIG. 16 and may be calculated by a difference in a unit time. The swing input determination unit 81 performs the swing input determination of the left controller 3, using the acceleration (moving average) exemplified in the middle graph of FIG. 16 and the acceleration change exemplified in the lower graph of FIG. 16.

First, the swing input determination unit 81 determines whether the acceleration change is equal to or larger than a first threshold (step S151). The processing is repetitively executed until the acceleration change becomes equal to or larger than the first threshold (NO in step S151). When the acceleration change becomes equal to or larger than the first threshold (time t1 of the lower graph of FIG. 16) (YES in step S151), the swing input determination unit 81 determines that a state is a state in which there is a sign of the swing input (hereinafter, referred to as the "swing sign state") and a swing sign flag is turned on (set to "1") (step S152).

In the swing sign state (state in which the swing sign flag is turned on), the swing input determination unit 81 determines whether the magnitude of the acceleration is equal to or larger than a second threshold (step S153). When the magnitude of the acceleration is smaller than the second threshold (NO in step S153), the swing input determination unit 81 determines whether the acceleration change becomes smaller than the first threshold (step S154). When the acceleration change is still equal to or larger than the first threshold (NO in step S154), the swing input determination unit 81 maintains the swing sign state, returns to step S153, and determines whether the magnitude of the acceleration is equal to or larger than the second threshold. When the acceleration change becomes smaller than the first threshold before the magnitude of the acceleration becomes equal to or larger than the second threshold (YES in step S154), the swing input determination unit 81 releases the swing sign state (sets the swing sign flag to "0") (step S155), returns to step S151, and redetermines whether the acceleration change is larger than the first threshold.

When the acceleration has become equal to or larger than the second threshold in the swing sign state (time t2 of the middle graph of FIG. 16) (YES in step S153), the swing input determination unit 81 determines that a state has become the swing state and turns on a swing state flag (sets the swing state flag to "1") (step S156). If the state becomes the swing state, the swing input determination unit 81 focuses on the acceleration change again and determines whether the acceleration change has become 0 (step S157). The swing input determination unit 81 maintains a waiting state until the acceleration change becomes 0 (NO in step S156) and determines that the swing input operation has been performed (step S158), at timing when the acceleration change has become 0 (time t3 of the lower graph of FIG. 16) (YES in step S157).

When the acceleration change becomes 0 after the state becomes the swing state (YES in step S157 after YES in step S153), this means that the magnitude of the acceleration reaches a peak after becoming equal to or larger than the second threshold, as apparent from the middle and lower graphs of FIG. 16. That is, the swing input determination unit 81 performs the swing input determination at timing when the magnitude of the acceleration has become larger than the second threshold and has been maximized. When the user performs the swing input operation to exert a snap of a wrist with a movement of an arm, the swing input determination unit 81 performs the swing input determination, at timing when the snap is strongest. For the determination timing, the swing input determination is performed in the moment of releasing an object when the object is thrown by a snap operation for the user and when a player character is caused to perform an operation for throwing the object to correspond to the swing input operation, as gaming processing, a sense that the user actually throws the object is obtained.

In the above example, the swing input determination unit 81 first takes a moving average of the magnitude of the acceleration (raw data) shown by the acceleration data obtained from the left controller 3 and determines whether the change of the moving average is equal to or larger than the first threshold (step S151), whether the moving average becomes equal to or larger than the second threshold (step S154), and whether the change of the moving average becomes 0 (step S156). However, the raw data obtained from the left controller 3 may be used as it is and each determination may be performed, without calculating the moving average. In addition, in the above example, the swing input determination is performed at the timing when the acceleration change becomes 0. However, the timing when the swing input determination is performed is not limited thereto. For example, when the acceleration change becomes equal to or smaller than a third threshold close to 0, the swing input determination may be performed. For example, the processed acceleration data is actually a digital value and a processing interval is a discrete value. For this reason, the timing when the acceleration becomes 0 may have passed according to a processing method and the determination may be performed in consideration of such an error. Or, a point of time when it is determined that the timing when the acceleration change becomes 0 has passed may be set as the timing when the acceleration change becomes 0.

The swing direction determination may be performed after the swing input determination is performed in step S158 and may be performed in parallel to the swing input determination. When the gaming processing corresponding to the swing input corresponds to only a specific swing direction and corresponding gaming processing is executed (the gaming processing is not set) even though there is a swing input according to a swing direction, the swing direction may be determined at the timings of the determination of the swing sign state (step S151) and the determination of the swing state (step S154) and when the swing direction is not a direction corresponding to the gaming processing, the swing input determination may end.

In addition, in the above example, the swing input determination unit 81 uses that the acceleration becomes equal to or larger than the second threshold in the swing sign state as the condition to determine the state as the swing state. As a result, the swing state is determined after the swing sign is determined by the acceleration change, so that the case in which the acceleration increases moderately and is more than the second threshold can be caused not to be recognized as the swing state. Instead, the swing input determination unit 81 may use that the acceleration becomes equal to or larger than the second threshold as the condition to determine the state as the swing state. That is, the swing input determination unit 81 may determine the swing state by only the magnitude of the acceleration without considering the acceleration change and may perform the swing input determination at timing when the magnitude of the acceleration reaches a peak.

In addition, in the above example, when the magnitude of the acceleration becomes the peak (maximized) after the magnitude of the acceleration becomes equal to or larger than the second threshold (that is, after the state becomes the swing state), the swing input determination unit 81 performs the swing input determination. As a result, when the acceleration change increases, but the acceleration does not increase, for example, the left controller 3 collides with an object lightly and an impact is applied to the left controller 3, it is possible to avoid a situation in which it is erroneously determined that the swing input has been performed. Instead, when the acceleration change becomes equal to or larger than the first threshold, the swing input determination unit 81 may determine that the state has become the swing state and may perform the swing input determination at timing when the magnitude of the acceleration has reached the peak.

In addition, in the above example, when the acceleration change becomes smaller than the first threshold (NO in step S154) before the magnitude of the acceleration becomes equal to or larger than the second threshold, after the state becomes the swing sign state, the swing input determination unit 81 releases the swing sign state. Instead, after the acceleration change is more than the first threshold, the swing input determination unit 81 may maintain the swing sign state for constant time, regardless of the magnitude of the acceleration change. In this case, when the magnitude of the acceleration is not more than the second threshold in the constant time in the swing sign state, the swing sign state is released.

(Simultaneous Swing Determination)

Figure 17:
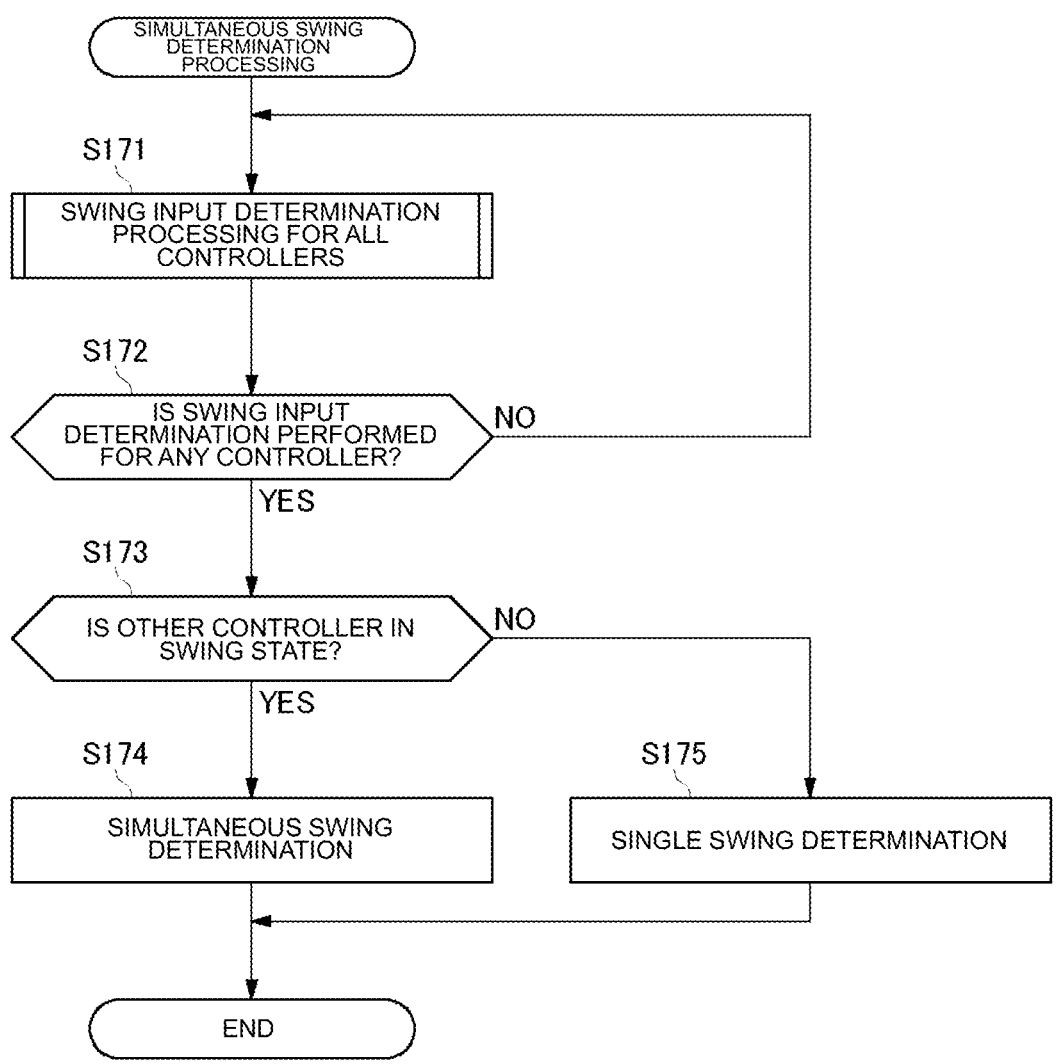
FIG. 17 is a flowchart illustrating an example of simultaneous swing determination processing according to the embodiment.

Next, the simultaneous swing determination of the left controller 3 and the right controller 4 will be described. FIG. 17 is a flowchart of simultaneous swing determination processing. In the case in which the swing input determination unit 81 performs the swing input determination for any one of the left controller 3 and the right controller 4, if the other is in a swing state, the swing input determination unit 81 performs the simultaneous swing determination for the left controller 3 and the right controller 4. That is, the swing input determination unit 81 first performs the swing input determination illustrated in FIG. 15, for all controllers (in this embodiment, the left controller 3 and the right controller 4) (step S171).

The swing input determination unit 81 determines whether the swing input determination has been performed for any controller (step S172), returns to step S171 until the swing input determination is performed for any controller (NO in step S172), and repetitively performs the swing input determination for all controllers. When the swing input determination has been performed for any controller (YES in step S172), the swing input determination unit 81 determines whether the other controller is in the swing state (the swing state flag becomes "1") (step S173).

When the other controller is in the swing state (YES in step S173), the swing input determination unit 81 determines that the simultaneous swing input has been performed for the controller in the swing state and the controller in which it is determined in step S172 that the swing input has been performed (step S174). Meanwhile, in the case in which the swing input determination has been performed for any controller, when the other controller is not in the swing state (when the swing state flag becomes "0"), the swing input determination unit 81 determines that only the controller in which the swing input determination has been performed in step S172 is swung and performs the one-hand swing determination for the controller (step S175).

Figure 18:
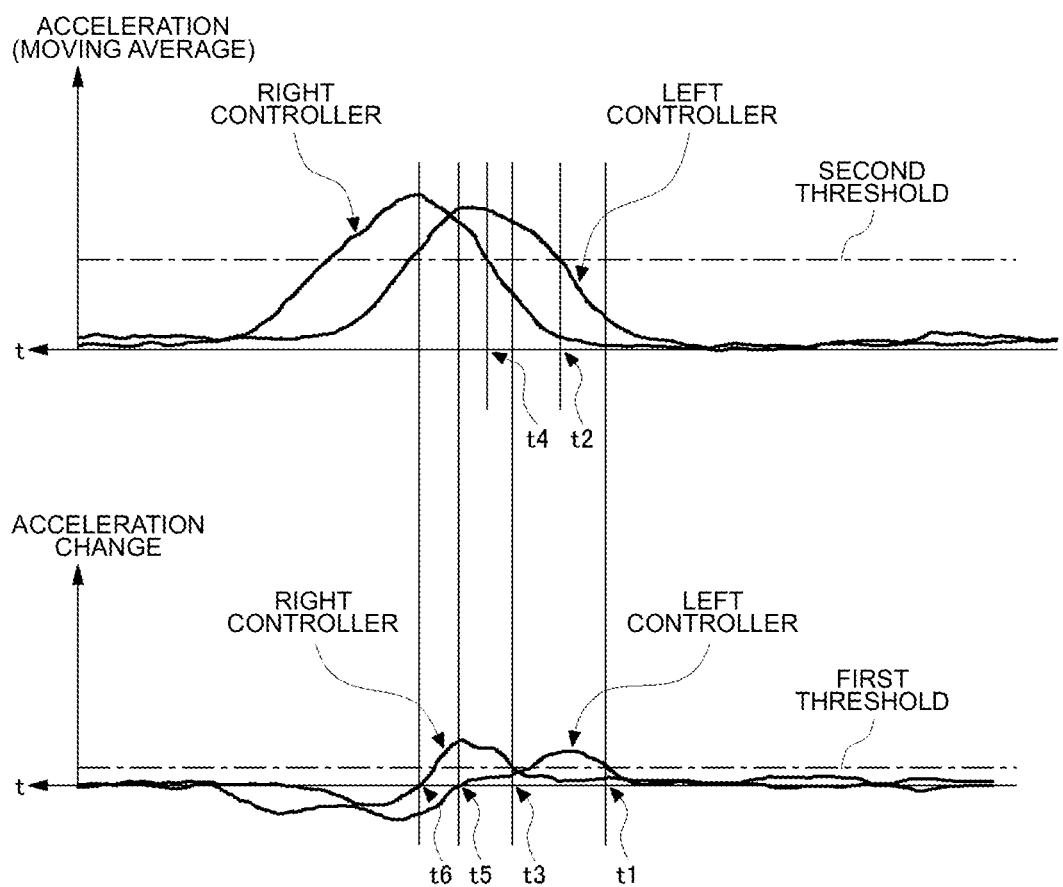
FIG. 18 shows graphs illustrating an example of acceleration data (moving average) and an acceleration change according to the embodiment.

FIG. 18 shows graphs illustrating an example of accelerations (moving averages) of the left controller 3 and the right controller 4 and changes of the accelerations thereof. In FIG. 18, a right side of each graph shows a past value and a left side of the graph shows a current value.

An example of the simultaneous determination will be described using FIG. 18. In this example, the user swings the left controller 3 and the right controller 4 simultaneously to perform the simultaneous swing input operation. However, in actuality, a slight deviation is generated in timing of the swing input operation of the left controller 3 and timing of the swing input operation of the right controller 4. That is, the timing of the swing input operation of the left controller 3 is slightly earlier than the timing of the swing input operation of the right controller 4.

At time t1, first, the acceleration change of the left controller 3 reaches the first threshold and the left controller 3 enters the swing sign state. Then, at time t2, the magnitude of the acceleration of the left controller 3 reaches the second threshold and the left controller 3 enters the swing state. At time t3 later than the time in the left controller 3, the acceleration change of the right controller 4 reaches the first threshold and the right controller 4 enters the swing sign state. Then, at time t4, the magnitude of the acceleration of the right controller 4 reaches the second threshold and the right controller 4 enters the swing state. That is, at the time t4, both the left controller 3 and the right controller 4 enter the swing state.

At time t5, if the acceleration change of the left controller 3 entering the swing state first becomes 0 and the magnitude of the acceleration is maximized, the swing input determination unit 81 determines that the swing input operation has been performed for the left controller 3 by the swing input determination processing illustrated in FIG. 15 (performs the swing input determination). At this time, because the right controller 4 is in the swing state, the swing input determination unit 81 assumes that the swing input operation has been performed for the right controller 4 at the same time as the left controller 3 and determines that the left controller 3 and the right controller 4 have been swung, at the timing when the swing input determination has been performed for the left controller 3.

In actuality, the magnitude of the acceleration of the right controller 4 becomes a peak at time t6. However, the swing input determination unit 81 assumes that the swing operation has been performed for the right controller 4, at the time t5 when the swing determination has been performed for the left controller 3, earlier than the time t6 when the magnitude of the acceleration of the right controller 4 becomes the peak, and performs the simultaneous swing determination for the left controller 3 and the right controller 4.

In the simultaneous swing input, if the controller in which the swing input operation is performed first is called a "first controller" and the controller in which the swing input operation is performed slightly later than the first controller is called a "second controller", in the case in which the second controller is in the swing state at the timing when the swing input determination has been performed for the first controller, the swing input determination unit 81 performs the simultaneous swing determination for the first and second controllers. In other words, in the case in which the acceleration change of the second controller is more than the first threshold and the acceleration of the second controller is more than the second threshold, at the timing when the swing determination has been performed for the first controller, the swing input determination unit 81 determines that the swing input operation has been performed for the second controller, at the same timing as the first controller.

In addition, when the second controller is not in the swing state at the timing when the swing input determination has been performed for the first controller, the swing input determination unit 81 determines that the swing is the one-hand swing of the first controller (that is, the swing is not the simultaneous swing) immediately at the timing.

As such, according to the swing input determination unit 81 according to this embodiment, even though the swing input operation has not been performed for the second controller (the swing input determination has not been performed) when the swing input operation has been performed (the swing input determination has been performed) for the first controller, the simultaneous swing determination can be performed for the first controller and the second controller at the timing when the swing input operation has been performed for the first controller and when the simultaneous swing determination is not performed, it can be determined that the swing is the one-hand swing of the first controller.

In the above example, the swing state is used as the condition to perform the swing input determination for each controller and the swing state used as the condition when the swing input determination is performed for the first controller is used as the condition even in the case in which the simultaneous swing determination is performed for the second controller when the swing input determination is performed for the first controller. That is, both the condition used when the swing input determination is performed for the first controller and the condition used when the simultaneous swing determination is performed for the second controller are the same condition of "the swing state".

However, the simultaneous swing determination by the swing input determination unit 81 is not limited thereto. The swing input determination may be performed for the first controller under any condition, it may be determined whether the second controller is in the swing state under any condition different from the condition of the swing input determination for the first controller, and when the second controller is under the swing state, the simultaneous swing determination may be performed.

In this case, the swing state is a state in which it may be determined that the user performs the operation for swing the controller. However, because the operation for swing the controller is an operation with a certain time passage, the swing input determination unit 81 may not determine that the swing input operation has been performed at the timing when the state has become the swing state and the timing when the swing input determination is performed may be degressively appropriate timing for the user. Therefore, the swing input operation and the swing input determination are performed when the controller is in the swing state.

For example, in the same way as the above example, for the first controller, when the acceleration change is equal to or larger than the first threshold, the swing input determination unit 81 determines the state as the swing sign state, when the magnitude of the acceleration becomes the second acceleration in the swing sign state, the swing input determination unit 81 determines the state as the swing state, and when the acceleration change becomes 0 in the swing state, the swing input determination unit 81 performs the swing input determination. However, in the simultaneous swing determination of the second controller performed at that time, for the second controller, when the acceleration change becomes equal to or larger than a fifth threshold (different from the second threshold) after the acceleration change becomes equal to or larger than a fourth threshold (different from the first threshold) and the state is determined as the swing sign state, the swing input determination unit 81 may determine the state as the swing state and may perform the simultaneous swing determination.

[Gaming Processing]

Next, an example of gaming processing executed on the basis of the swing direction determination and the swing input determination will be described. FIGS. 19 to 22 are diagrams illustrating examples of the gaming processing. Hereinafter, the CPU 81 executing the gaming processing is called a gaming processing unit 81. In a game, a player character PC exists in a virtual space VS, a user can command a movement or a behavior of the player character PC in the virtual space VS using the left controller 3 or the right controller 4, and the gaming processing unit 81 can move the player character PC in the virtual space VS or causes the player character PC to take an action, on the basis of operation data (including acceleration data or angular velocity data) from the left controller 3 or the right controller 4.

For example, the gaming processing unit 81 executes gaming processing in which the player character PC throws a throwing object C and the throwing object C flies, when the swing input determination unit 81 performs the swing input determination (step S158 of FIG. 15). In addition, the gaming processing unit 81 executes the gaming processing according to determination on whether the flown throwing object C has hit an enemy object in the virtual space. The throwing object C may be determined according to game contents. For example, the throwing object C may be a ball, a boomerang, and a knife. In addition, the throwing object C may be a hat which the player character puts on. In addition, the gaming processing unit 81 causes the player character PC to execute different operations and causes the throwing object C to fly differently, in the case in which the one-hand swing is determined by the swing input determination unit 81 and the case in which the simultaneous swing is performed by the swing input determination unit 81. In addition, the gaming processing unit 81 causes the player character PC to execute a different operation and causes the throwing object C to fly differently, according to the swing direction determined by the swing direction determination unit 81.

Figure 19:
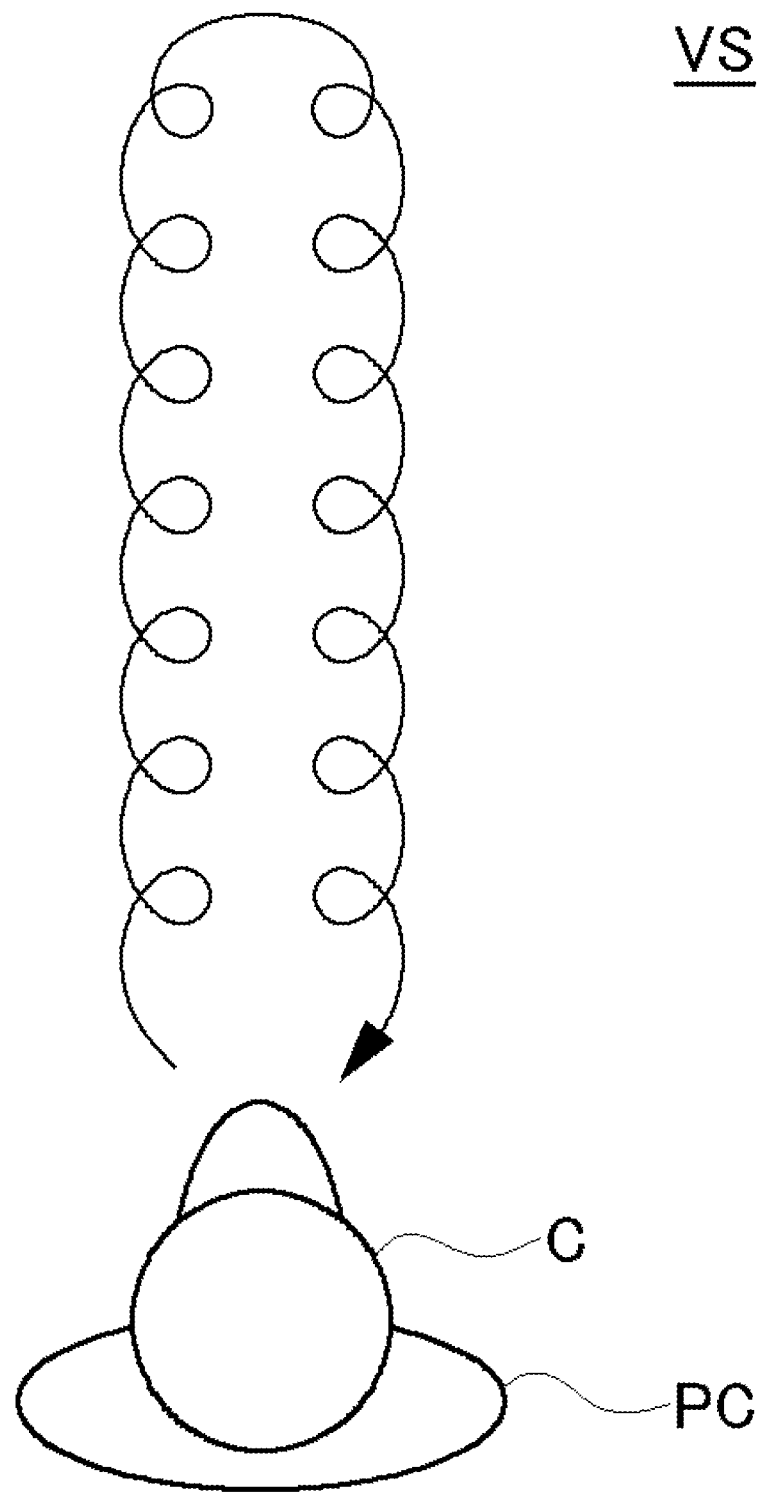
FIG. 19 is a diagram illustrating an example of gaming processing according to the embodiment.

FIG. 19 illustrates a flight trajectory of the throwing object C when the one-hand swing is performed in a rightward direction, in the left controller 3 or the right controller 4. FIGS. 19 to 22 are diagrams illustrating the player character PC in the virtual space VS and the flight trajectory of the throwing object C and FIGS. 19 to 22 are not necessarily displayed as a game screen. The game screen is displayed as an image (video) from a virtual camera set to the virtual space and a visual point position and a direction of the virtual camera can be arbitrarily set.

As illustrated in FIG. 19, when the one-hand swing is performed in the rightward direction, the throwing object C flies while rotating to the right in front of the player character PC, is folded in a place separated by a predetermined distance, and returns to the player character PC. At this time, the player character PC performs an operation for flying the throwing object C forward while rotating the throwing object C to the right and performs an operation for receiving the throwing object C, when the throwing object C returns to the player character PC. The behaviors of the player character PC and the throwing object C are the gaming processing (one-hand swing gaming processing of the rightward direction) according to the one-hand swing of the rightward direction by the gaming processing unit 81. When the swing is performed while the throwing object flies, a trajectory may change according to the swing direction.

Figure 20:
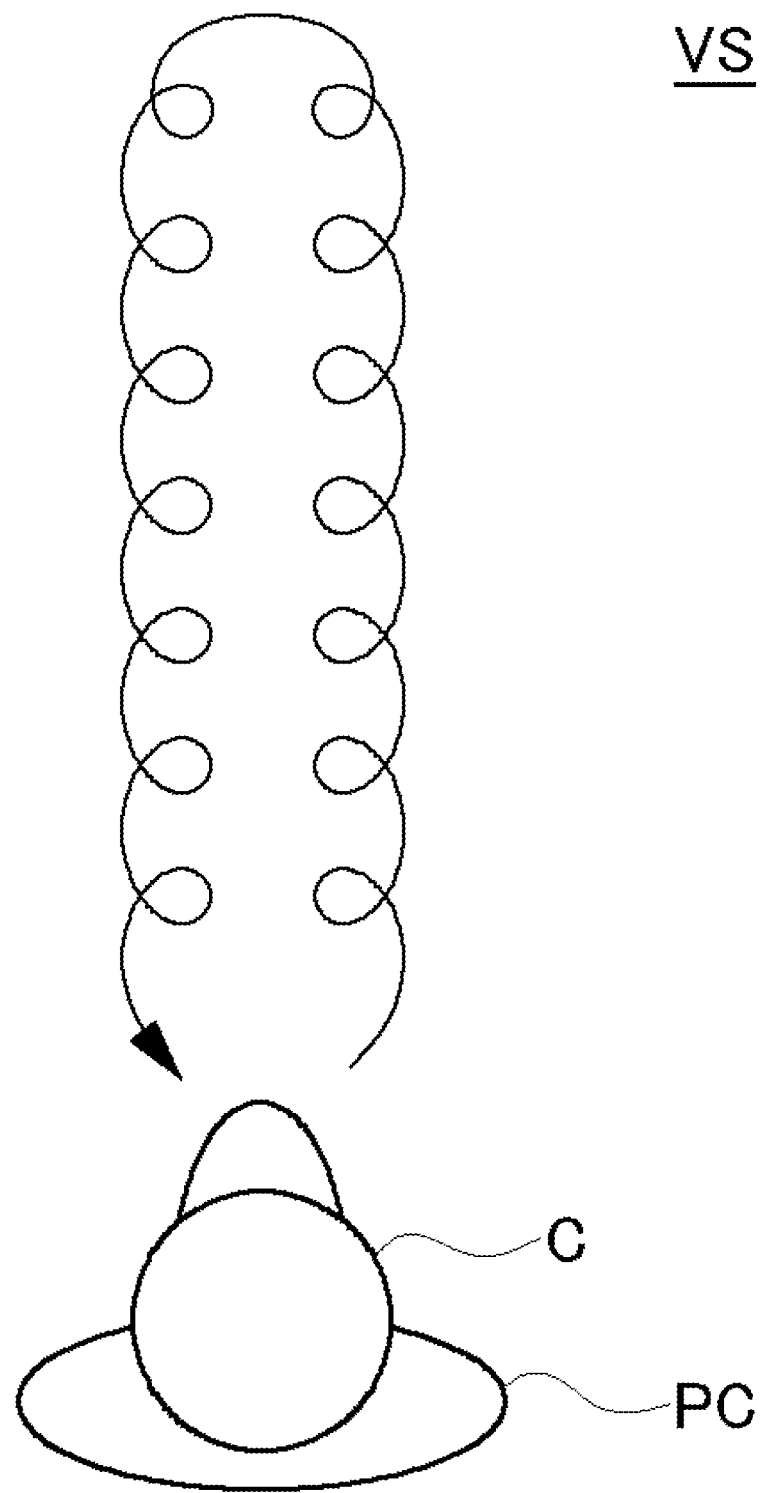
FIG. 20 is a diagram illustrating another example of the gaming processing according to the embodiment.

FIG. 20 illustrates a flight trajectory of the throwing object C when the one-hand swing is performed in a leftward direction, in the left controller 3 or the right controller 4. When the one-hand swing is performed in the leftward direction, the throwing object C flies while rotating to the left in front of the player character PC, is folded in a place separated by a predetermined distance, and returns to the player character PC. At this time, the player character PC performs an operation for flying the throwing object C forward while rotating the throwing object C to the left and performs an operation for receiving the throwing object C, when the throwing object C returns to the player character PC. The behaviors of the player character PC and the throwing object C are the gaming processing (one-hand swing gaming processing of the leftward direction) according to the one-hand swing of the leftward direction by the gaming processing unit 81. When the swing is performed while the throwing object flies, a trajectory may change according to the swing direction.

Figure 21:
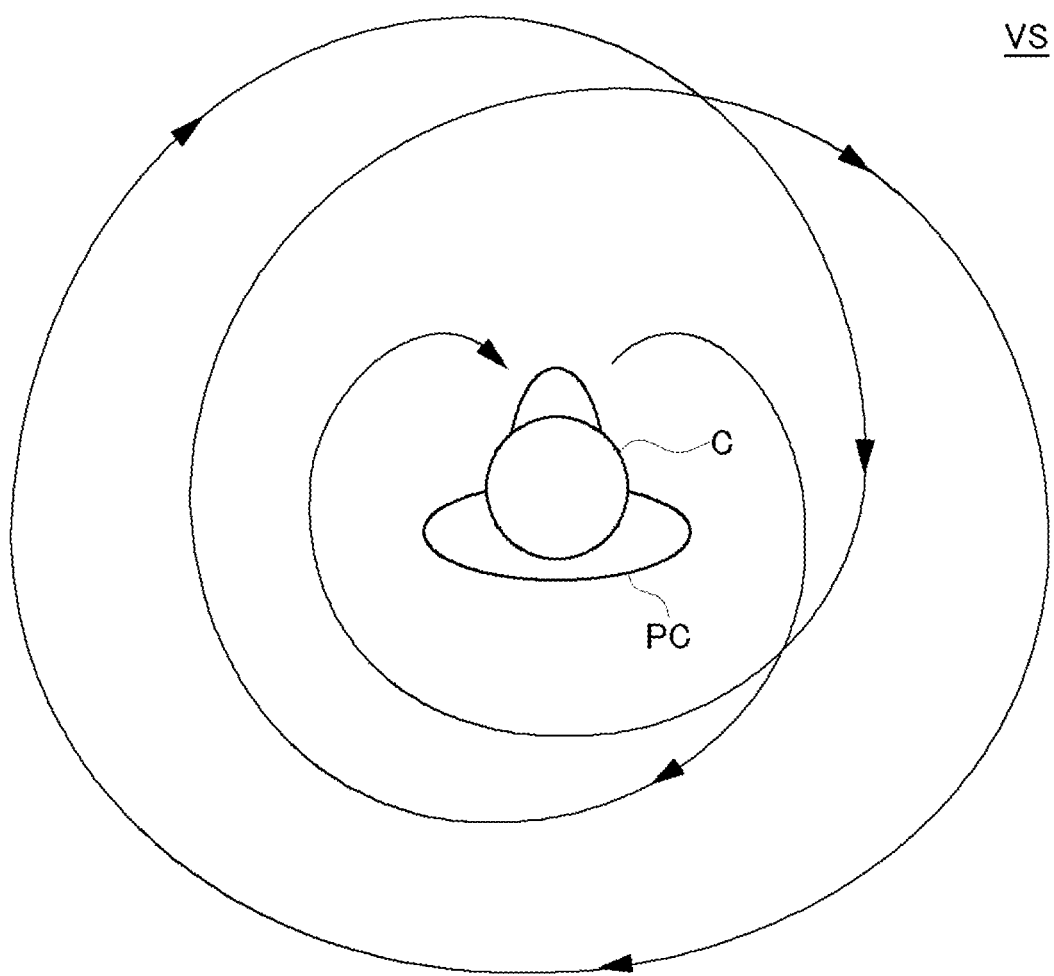
FIG. 21 is a diagram illustrating another example of the gaming processing according to the embodiment.

FIG. 21 illustrates a flight trajectory of the throwing object C when the simultaneous swing is performed in a rightward direction, in the left controller 3 or the right controller 4. When the simultaneous swing is performed in the rightward direction, the throwing object C draws a spiral trajectory while rotating to the right around the player character PC, is separated from the player character PC, draws a spiral trajectory while rotating to the right around the player character PC in a place separated by a predetermined distance, and returns to the player character PC. At this time, the player character PC performs an operation for flying the throwing object C while rotating to the right and performs an operation for receiving the throwing object C, when the throwing object C returns to the player character PC. The behaviors of the player character PC and the throwing object C are the gaming processing (simultaneous swing gaming processing of the rightward direction) according to the simultaneous swing of the rightward direction by the gaming processing unit 81.

Figure 22:
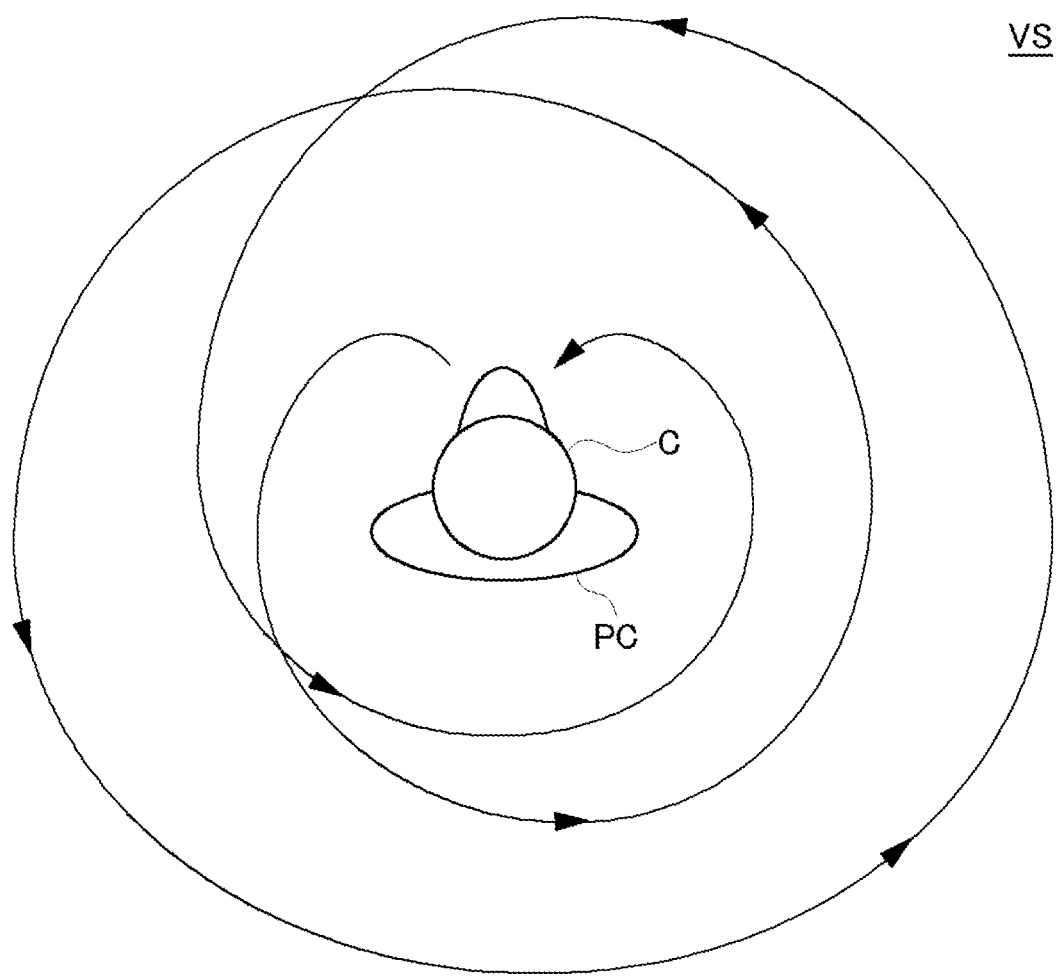
FIG. 22 is a diagram illustrating another example of the gaming processing according to the embodiment.

FIG. 22 illustrates a flight trajectory of the throwing object C when the simultaneous swing is performed in a leftward direction, in the left controller 3 or the right controller 4. When the simultaneous swing is performed in the leftward direction, the throwing object C draws a spiral trajectory while rotating to the left around the player character PC, is separated from the player character PC, draws a spiral trajectory while rotating to the left around the player character PC in a place separated by a predetermined distance, and returns to the player character PC. At this time, the player character PC performs an operation for flying the throwing object C while rotating to the left and performs an operation for receiving the throwing object C, when the throwing object C returns to the player character PC. The behaviors of the player character PC and the throwing object C are the gaming processing (simultaneous swing gaming processing of the leftward direction) according to the simultaneous swing of the leftward direction by the gaming processing unit 81. In this operation, the throwing object C can be flown in a wide range according to the simultaneous swing and an operation of a high effect in the game such as causing the throwing object C to hit the enemy object easily can be performed. In addition, when the left controller 3 and the right controller 4 are swung simultaneously in the upward direction or the downward direction, more different operations may be performed. For example, an operation for throwing the throwing object C in the upward direction in the virtual space or an operation for throwing the throwing object C to roll on the ground may be performed.

As such, in this embodiment, for the swing input operation of the one-hand swing, when the one-hand swing is performed by any controller, the gaming processing unit 81 executes the one-hand swing gaming processing according to the one-hand swing. However, in a modification, the gaming processing unit 81 may execute different gaming processing in the one-hand swing performed by the left controller 3 and the one-hand swing performed by the right controller 4.

In addition, in this embodiment, the gaming processing unit 81 executes the simultaneous swing gaming processing for only the case in which the left controller 3 and the right controller 4 are swung simultaneously in the same direction. However, the gaming processing unit 81 may set simultaneous swing gaming processing to be executed when the simultaneous swing is performed in different directions and may execute the simultaneous swing gaming processing when the simultaneous swing is performed in the different directions.

[Modification]

In the embodiment described above, in the description of the simultaneous swing determination and the gaming processing, the case in which the controllers are two is described as an example. However, the controller may be three or more and the simultaneous swing of the three or more controllers may be determined in the simultaneous swing determination. In the case in which the simultaneous swing determination of the three or more controllers is performed, when it is determined that the swing input operation has been performed for one controller among the plurality of controllers, the swing input determination unit 81 assumes that the swing input determination has been performed for the other controllers in the swing state among the plurality of controllers, at the same time as one controller, and may perform the simultaneous swing determination.

In addition, in the embodiment, the case in which the magnitude of the acceleration is more than the second threshold in the swing sign state is used as the condition (swing state determination condition) to determine the swing state and the case in which the acceleration change becomes 0 in the swing state is used as the condition (swing input determination condition) to determine that the swing input operation has been performed. However, the swing state determination condition and the swing input determination condition may be any other conditions. Because the operation for swing the controller needs the certain time, the swing input determination unit 81 may determine a state in which the operation is being performed as the swing state and may determine that the swing input operation has been performed, when the predetermined condition is satisfied in the swing state. The swing input determination condition is not limited to the condition (the acceleration change is 0) according to the embodiment. For example, the swing input determination condition may be that the acceleration change has become equal to or smaller than the third threshold close to 0 or that the magnitude of the acceleration has become equal to or larger than a predetermined threshold larger than the second threshold.

In addition, in the embodiment, the swing input determination and the simultaneous swing determination are performed for the basis of the acceleration data obtained from the acceleration sensor and the swing direction determination is performed for the basis of the angular velocity data obtained from the angular velocity sensor. However, the swing input determination and the simultaneous swing determination may be performed for the basis of the angular velocity data, instead of the acceleration data or in addition to the acceleration data, and the swing direction determination may be performed for the basis of the acceleration data, instead of the angular velocity data or in addition to the angular velocity data. That is, the gaming device may acquire the operation data including at least the data of the inertial sensor from the plurality of controllers including at least the inertial sensor including the acceleration sensor and the angular velocity sensor and may perform the swing input determination or the simultaneous swing determination for the controllers, on the basis of the operation data.

In addition, in the embodiment, the gaming system 1 is configured to include the body device 2, the left controller 3, and the right controller 4. However, a part or all of the elements of the body device 2 may be included in any controller. In this case, an element such as the CPU 81 is included in any one of the left controller 3 and the right controller 4 or both the left controller 3 and the right controller 4. In this case, the swing input determination processing illustrated in FIG. 15 may be executed by each of the left controller 3 and the right controller 4, a result thereof may be transmitted to the body device 2, and the body device 2 may perform the simultaneous swing determination, on the basis of the results of the swing input determination processing of the left controller 3 and the right controller 4.

In addition, when a part or all of the elements of the body device 2 are included in any one of the left controller 3 and the right controller 4 or both the left controller 3 and the right controller 4, the operation data is transmitted and received between the left controller 3 and the right controller 4.

In addition, in the embodiment, when the left controller 3 and the right controller 4 are in the separation state in which the left controller 3 and the right controller 4 are removed from the body device 2, the operation data is transmitted from the left controller 3 and the right controller 4 to the body device 2 by the wireless communication. However, even when the left controller 3 and the right controller 4 are in the separation state, the left controller 3 and the right controller 4 may be connected to the body device 2 by wire and the operation data may be transmitted to the body device 2 by the wired communication. In this case, the configuration in which the operation data is received from the left controller 3 and the right controller 4 by the wired communication in the body device 2 corresponds to the operation data acquisition unit.

In addition, the left controller 3 and the right controller 4 may be connected by wire or wireless, the operation data of one controller may be transmitted to the other controller, and the operation data of one controller and the operation data of the other controller may be transmitted from one controller to the body device 2.

FIG. 2
REMOVABLE
FIG. 8
17: LEFT TERMINAL
23: FIRST SLOT
24: SECOND SLOT
91: FIRST SLOT I/F
92: SECOND SLOT I/F
26: VOLUME BUTTON
28: POWER SUPPLY BUTTON
97: POWER CONTROL UNIT

98: BATTERY
27: LOWER TERMINAL
21: RIGHT TERMINAL
82: NETWORK COMMUNICATION UNIT
83: CONTROLLER COMMUNICATION UNIT
84: FLASH MEMORY
86: TOUCH PANEL CONTROLLER
87: CODEC CIRCUIT
89: ACCELERATION SENSOR
90: ANGULAR VELOCITY SENSOR
13: TOUCH PANEL
12: DISPLAY
88: SPEAKER
25: VOICE INPUT/OUTPUT TERMINAL
FIG. 9
101: COMMUNICATION CONTROL UNIT
102: MEMORY
103: INDIVIDUAL BUTTON
32: STICK
104: ACCELERATION SENSOR
105: ANGULAR VELOCITY SENSOR
45: LED FOR NOTIFICATION
106: AMPLIFIER
107: VIBRATOR
108: POWER SUPPLY UNIT
42: TERMINAL
83: CONTROLLER COMMUNICATION UNIT
17: LEFT TERMINAL
21: RIGHT TERMINAL
64: TERMINAL
122: NFC COMMUNICATION UNIT
123: INFRARED IMAGING UNIT
121: PROCESSING UNIT
111: COMMUNICATION CONTROL UNIT
112: MEMORY
113: INDIVIDUAL BUTTON
52: STICK
114: ACCELERATION SENSOR
115: ANGULAR VELOCITY SENSOR
67: LED FOR NOTIFICATION
116: AMPLIFIER
117: VIBRATOR
118: POWER SUPPLY UNIT
FIG. 10
27: LOWER TERMINAL
73: BODY TERMINAL
133: POWER CONTROL UNIT
134: POWER SUPPLY TERMINAL
131: CONVERSION UNIT
136: CONNECTION PROCESSING UNIT
132: TERMINAL FOR MONITOR
137: TERMINAL FOR EXTENSION
FIG. 15
1: SWING INPUT DETERMINATION PROCESSING
S151: IS ACCELERATION CHANGE EQUAL TO OR LARGER THAN FIRST THRESHOLD?
S152: SWING SIGN FLAG
S153: IS MAGNITUDE OF ACCELERATION EQUAL TO OR LARGER THAN SECOND THRESHOLD?
S154: IS ACCELERATION CHANGE SMALLER THAN FIRST THRESHOLD?
S155: SWING SIGN FLAG
S156: SWING STATE FLAG
S157: IS ACCELERATION CHANGE 0?
S158: SWING INPUT DETERMINATION
2: RETURN
FIG. 16
1: ACCELERATION (RAW DATA)
2: ACCELERATION (MOVING AVERAGE)
3: SECOND THRESHOLD
4: ACCELERATION CHANGE
5: SWING STATE
6: FIRST THRESHOLD
7: SWING INPUT DETERMINATION
8: SWING SIGN STATE
FIG. 17
1: SIMULTANEOUS SWING DETERMINATION PROCESSING
S171: SWING INPUT DETERMINATION PROCESSING FOR ALL CONTROLLERS
S172: IS SWING INPUT DETERMINATION PERFORMED FOR ANY CONTROLLER?
S173: IS OTHER CONTROLLER IN SWING STATE?
S174: SIMULTANEOUS SWING DETERMINATION
S175: ONE-HAND SWING DETERMINATION
2: END
FIG. 18
1: ACCELERATION (MOVING AVERAGE)
2: RIGHT CONTROLLER
3: LEFT CONTROLLER
4: SECOND THRESHOLD
5: ACCELERATION CHANGE
6: FIRST THRESHOLD

What is claimed is:

1. A gaming device, comprising:
a processor; and
a memory configured to store computer readable instructions that, when executed by the processor, cause the gaming device to:
acquire operation data including at least data of an inertial sensor from a plurality of operation devices each including at least the inertial sensor;
determine, for each of the operation devices, that each operation device entered a swing state in which each operation device is being swung and that a swing input operation for each operation device has been performed after the swing state, on the basis of the operation data; and
execute game processing on the basis of the determination, wherein
when it is determined that the swing input operation has been performed for a first operation device among the plurality of operation devices and a second operation device among the plurality of operation devices is in the swing state, the swing input operation is determined as having been performed for the second operation device and the first and second operation devices are determined as being simultaneously swung even if the swing input for the first operation device has not been performed.

2. The gaming device according to claim 1, wherein
when it is determined that the swing input operation has been performed for the first operation device and the second operation device is not in the swing state, the swing input operation is determined as having been performed for only the first operation device.

3. The gaming device according to claim 1, wherein
the inertial sensor includes at least an acceleration sensor and the operation data includes at least acceleration data from the acceleration sensor.

4. The gaming device according to claim 3, wherein
each operation device is determined as having entered the swing state at least when a change of acceleration shown by the acceleration data becomes a first threshold or more, for each of the operation devices.

5. The gaming device according to claim 3, wherein each operation device is determined as having entered the swing state at least when a magnitude of acceleration shown by the acceleration data becomes a second threshold or more, for each of the operation devices.

6. The gaming device according to claim 3, wherein each operation device is determined as having entered the swing state when a change of acceleration shown by the acceleration data becomes a first threshold or more, and then a magnitude of the acceleration becomes a second threshold or more, for each of the operation devices.

7. The gaming device according to claim 3, wherein the swing input operation is determined as having been performed when a change of acceleration shown by the acceleration data becomes 0 or a third threshold or less, for each of the operation devices.

8. The gaming device according to claim 1, wherein the inertial sensor includes at least an angular velocity sensor and the operation data includes at least angular velocity data from the angular velocity sensor.

9. The gaming device according to claim 1, further caused to:
determine a swing direction, on the basis of the operation data, for each of the operation devices; and
execute the game processing, on the basis of the swing direction.

10. The gaming device according to claim 9, wherein the inertial sensor includes at least an acceleration sensor and an angular velocity sensor, and the operation data includes at least acceleration data and angular velocity data,
each operation device is determined as having entered the swing state and that the swing input operation has been performed, on the basis of the acceleration data, and
the swing direction is determined on the basis of the angular velocity data.

11. The gaming device according to claim 10, further caused to:
calculate a posture of each of the operation devices, on the basis of at least the angular velocity data; and
determine the swing direction, on the basis of the calculated posture.

12. The gaming device according to claim 10, further caused to:
calculate a moving average of the acceleration data; and
determine the swing state and performance of the swing input operation, on the basis of the moving average.

13. A gaming device, comprising:
a processor; and
a memory configured to store computer readable instructions that, when executed by the processor, cause the gaming device to:
acquire operation data including at least acceleration data from each of a plurality of operation devices each including an acceleration sensor;
determine that a swing input is performed on the basis of the acceleration data, for each of the operation devices; and
execute game processing on the basis of the determination, wherein
when it is determined that the swing input has been performed for a first operation device among the plurality of operation devices and a change of acceleration of a second operation device among the plurality of operation devices becomes a first threshold or more and then a magnitude of the acceleration of the second operation device becomes a second threshold or more, the swing input is determined as having been performed for the second operation device at the same time as the first operation device.

14. The gaming device according to claim 13, wherein when a change of acceleration shown by the acceleration data becomes the first threshold or more and then a magnitude of the acceleration becomes the second threshold or more and the change of the acceleration becomes 0 or a third threshold or less, the swing input operation is determined as having been performed.

15. The gaming device according to claim 13, wherein each of the plurality of operation devices further includes an angular velocity sensor,
the operation data further includes angular velocity data,
the gaming device is configured to determine a swing direction of each of the operation devices, on the basis of the angular velocity data, and execute the game processing, on the basis of the swing direction.

16. A gaming system, comprising:
a plurality of operation devices; and
processing circuitry having at least a processor and a memory,
wherein each of the plurality of operation devices includes at least an inertial sensor and outputs operation data including at least data obtained from the inertial sensor,
the processing circuitry configured to:
determine, for each of the operation devices, that each operation device entered a swing state in which each operation device is being swung and that a swing input operation for each operation device has been performed after the swing state, on the basis of the operation data; and
execute game processing on the basis of the determination, and
when it is determined that the swing input operation has been performed for a first operation device among the plurality of operation devices and a second operation device among the plurality of operation devices is in the swing state, the swing input operation is determined as having been performed for the second operation device and the first and second operation devices are determined as being simultaneously swung even if the swing input for the first operation device has not been performed.

17. A non-transitory computer readable storage medium having stored therein a gaming program causing a gaming device to perform execution comprising:
acquiring operation data including at least data of an inertial sensor from a plurality of operation devices each including at least the inertial sensor;
determining, for each of the operation devices, that each operation device entered a swing state in which each operation device is being swung and that a swing input operation for each operation device has been performed after the swing state, on the basis of the operation data; and
executing game processing on the basis of the determination, wherein
when it is determined that the swing input operation has been performed for a first operation device among the plurality of operation devices and a second operation device among the plurality of operation devices is in the swing state, the swing input operation is determined as having been performed for the second operation device and the first and second operation devices are determined as being simultaneously swung even if the swing input for the first operation device has not been performed.

18. A non-transitory computer readable storage medium having stored therein a gaming program causing a gaming device to perform execution comprising:
acquiring operation data including at least acceleration data from each of a plurality of operation devices each including an acceleration sensor;
determining that a swing input operation has been performed on the basis of the acceleration data, for each of the operation devices; and
executing game processing on the basis of the determination, wherein
when it is determined that the swing input operation has been performed for a first operation device among the plurality of operation devices and a change of acceleration of a second operation device among the plurality of operation devices becomes a first threshold or more and then a magnitude of the acceleration of the second operation device becomes a second threshold or more, the swing input operation is determined as having been performed for the second operation device at the same time as the first operation device.

19. The non-transitory computer readable storage medium according to claim 18, wherein
each of the plurality of operation devices further includes an angular velocity sensor,
the operation data further includes angular velocity data,
the gaming program causes the gaming device to determine a swing direction of each of the operation devices, on the basis of the angular velocity data, and
the game processing is executed on the basis of the swing direction.

20. A swing input determination method, comprising:
acquiring operation data including at least data of an inertial sensor from a plurality of operation devices each including at least the inertial sensor; and
determining, for each of the operation devices, that each operation device entered a swing state in which each operation device is being swung and that a swing input operation for each operation device has been performed after the swing state, on the basis of the operation data, wherein
when it is determined that the swing input operation has been performed for a first operation device among the plurality of operation devices and a second operation device among the plurality of operation devices is in the swing state, the swing input operation is determined as having been performed for the second operation device and the first and second operation devices are determined as being simultaneously swung even if the swing input for the first operation device has not been performed.

* * * * *